(12) United States Patent
Kasamatsu et al.

(10) Patent No.: US 6,605,386 B1
(45) Date of Patent: Aug. 12, 2003

(54) NON-AQUEOUS ELECTROLYTE SECONDARY BATTERY COMPRISING COMPOSITE PARTICLES

(75) Inventors: Shinji Kasamatsu, Osaka (JP); Hiroshi Yoshizawa, Osaka (JP); Kazuhiro Okamura, Osaka (JP); Hizuru Koshina, Osaka (JP); Harunari Shimamura, Osaka (JP); Yoshiaki Nitta, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/601,224
(22) PCT Filed: Nov. 30, 1999
(86) PCT No.: PCT/JP99/06687
§ 371 (c)(1),
(2), (4) Date: Sep. 18, 2000
(87) PCT Pub. No.: WO00/33401
PCT Pub. Date: Aug. 6, 2000

(30) Foreign Application Priority Data

| Dec. 2, 1998 | (JP) | 10-342881 |
| Dec. 2, 1998 | (JP) | 10-342882 |
| Dec. 2, 1998 | (JP) | 10-342883 |
| Dec. 2, 1998 | (JP) | 10-342884 |
| Dec. 2, 1998 | (JP) | 10-342895 |
| Dec. 2, 1998 | (JP) | 10-342896 |
| Dec. 2, 1998 | (JP) | 10-342897 |
| Dec. 2, 1998 | (JP) | 10-342898 |
| Dec. 2, 1998 | (JP) | 10-342899 |
| Dec. 2, 1998 | (JP) | 10-342900 |
| Dec. 2, 1998 | (JP) | 10-342901 |
| Dec. 2, 1998 | (JP) | 10-342902 |
| Dec. 2, 1998 | (JP) | 10-342905 |
| Dec. 2, 1998 | (JP) | 10-342906 |

(51) Int. Cl.$^7$ .................................. H01M 4/62
(52) U.S. Cl. .............. 429/218.1; 429/229; 429/231.95; 429/304; 429/231.1; 429/231.7
(58) Field of Search .................... 429/218.1, 229, 429/231.95, 304, 231.1, 231.7

(56) References Cited

U.S. PATENT DOCUMENTS 4,302,518 A    11/1981  Goodenough et al. ...... 429/104

(List continued on next page.)

FOREIGN PATENT DOCUMENTS

EP     0 730 316     9/1996

(List continued on next page.)

OTHER PUBLICATIONS

K. M. Abraham et al., "Li$^+$–Conductive Solid Polymer (List continued on next page.)

*Primary Examiner*—Laura Weiner
(74) *Attorney, Agent, or Firm*—RatnerPrestia

(57) ABSTRACT

A non-aqueous electrolyte secondary battery comprises a positive electrode and a negative electrode capable of inter-calating and de-intercalating lithium, a non-aqueous electrolyte and separators or solid electrolytes. The negative electrode contains, as a main component, composite particles constructed in such a manner that at least part of the surface of nuclear particles comprising at least one of tin, silicon and zinc as a constituent element, is coated with a solid solution or an inter-metallic compound composed of the element included in the nuclear particles and another predetermined element which is not an element included in the nuclear particles. To improve the ability of the battery, the composite particles mentioned above can include at least one trace element selected from iron, lead and bismuth. The porosity of a mixture layer at the negative electrode is 10% or more and 50% or less. The amount of the non-aqueous electrolyte, the thickness of the separators or the like is restricted in a specific value. The foregoing construction suppresses occurrence of an internal short circuit between the positive electrode and the negative electrode caused by expansion of the negative electrode materials, thereby achieving a high capacity battery with a superior charge/discharge cycle properties, which is suitable for a high-speed charging.

35 Claims, 5 Drawing Sheets

U.S. PATENT DOCUMENTS

| | | | |
|---|---|---|---|
| 4,303,748 A | 12/1981 | Armand et al. | 429/192 |
| 4,427,751 A | 1/1984 | Furukawa et al. | 429/206 |
| 5,085,952 A | 2/1992 | North | 429/192 |
| 5,160,712 A | 11/1992 | Thackeray et al. | 423/138 |
| 5,223,353 A | 6/1993 | Ohsawa et al. | 429/192 |
| 5,275,750 A | 1/1994 | Sato et al. | 252/62.2 |
| 5,296,318 A | 3/1994 | Gozdz et al. | 429/192 |
| 5,460,903 A | 10/1995 | St. Aubyn Hubbard et al. | 429/190 |
| 5,589,296 A | 12/1996 | Iwamoto et al. | 429/191 |
| 5,665,265 A | 9/1997 | Gies et al. | 429/192 |
| 5,677,081 A | 10/1997 | Iwamoto et al. | 429/191 |
| 5,770,333 A | 6/1998 | Saito et al. | 429/194 |
| 6,090,505 A | 7/2000 | Shimamura et al. | 429/218.1 |

FOREIGN PATENT DOCUMENTS

| | | |
|---|---|---|
| JP | 55-136131 | 10/1980 |
| JP | 63-274058 | 11/1988 |
| JP | 63-276873 | 11/1988 |
| JP | 3-14054 * | 1/1991 |
| JP | 03-037964 | 2/1991 |
| JP | 04-206479 | 7/1992 |
| JP | 4-242890 | 8/1992 |
| JP | 4-249073 | 9/1992 |
| JP | 4-267053 | 9/1992 |
| JP | 5-62712 | 3/1993 |
| JP | 05-234593 | 9/1993 |
| JP | 05-310418 | 11/1993 |
| JP | 6-36798 | 2/1994 |
| JP | 06-98473 | 4/1994 |
| JP | 6-103976 | 4/1994 |
| JP | 06-279049 | 10/1994 |
| JP | 7-240201 | 9/1995 |
| JP | 07-296854 | 11/1995 |
| JP | 8-250117 | 9/1996 |
| JP | 9-63651 | 3/1997 |
| JP | 9-259857 | 10/1997 |
| JP | 10-3947 | 1/1998 |
| JP | 10-36120 | 2/1998 |
| JP | 10-92424 | 4/1998 |
| JP | 10-257687 | 9/1998 |
| JP | 10-509683 | 9/1998 |
| JP | 10-316426 | 12/1998 |
| JP | 11-135120 | 5/1999 |
| JP | 11-185753 | 7/1999 |
| WO | WO 96/10538 | 4/1996 |
| WO | 98/07729 | 2/1998 |

OTHER PUBLICATIONS

Electrolytes with Liquid–Like Conductivity", Journal Electrochem. Society, vol. 137, No. 5, pp. 1657–1658 (1990).

J.R. MacCallum et al., "Polymer Electrolyte Reviews–2," 1989, pp. 229–305.

A. Rogier et al., "Effect of Cobalt Substitution on Cationic Distribution in $LiNi_{1-y}Co_yO_2$ Electrode Materials", *Solid State Ionics*, 90 (1996) pp. 83–90.

International Search Report corresponding to application No. PCT/JP99/06687 dated Feb. 22, 2000.

* cited by examiner

Ratio of the specific surface area

NON-AQUEOUS ELECTROLYTE SECONDARY BATTERY COMPRISING COMPOSITE PARTICLES

This application is a U.S. National Phase Application of PCT International application PCT/JP99/06687.

FIELD OF THE INVENTION

The present invention relates to a non-aqueous electrolyte secondary battery (hereinafter, battery). The present invention especially relates to batteries of which electrochemical properties such as charge/discharge capacity and charge/discharge cycle life have been enhanced by improvements in the negative electrode materials, separators and the amounts of electrolyte. The present invention further relates to batteries wherein the electrochemical properties mentioned above, as well as shelf stability, have been improved by designing a better balance between the positive electrode and the negative electrode materials, as well as the positive electrode and the negative electrode plates.

BACKGROUND OF THE INVENTION

Lithium secondary batteries with non-aqueous electrolytes, which are used in such areas as mobile communications devices, including portable information terminals and portable electronic devices, as power sources of portable electronic devices, domestic portable electricity storing devices, motor cycles using an electric motor as a driving source, electric cars and hybrid electric cars, have characteristics of a high electromotive force and a high energy density. Although the energy density of the lithium secondary batteries using lithium metal as a negative electrode material is high, there is a possibility that dendrite deposits form on the negative electrode during charging. By repeated charging and discharging, the dendrite breaks through separators to the positive electrode side, thereby causing an internal short circuit. The deposited dendrite has a large specific surface area, thus its reaction activity is high. Therefore, it reacts with solvents in the electrolyte solution on its surface and forms a surface layer which acts like a solid electrolyte having no electronic conduction. This raises the internal resistance of the batteries or causes some particles to be excluded from the network of electronic conduction, lowering the charge/discharge efficiency of the battery. Due to these reasons, the lithium secondary batteries using lithium metal as a negative electrode material have a low reliability and a short cycle life.

Nowadays, lithium secondary batteries which use carbon materials capable of intercalating and de-intercalating lithium ions as a negative electrode material are commercially available. In general, lithium metal does not deposit on carbon negative electrodes. Thus, in such batteries short circuits do not occur due to dendrite formation. However, the theoretical capacity of graphite, which is one of the currently available carbon materials, is 372 mAh/g, only one tenth of that of pure lithium (Li) metal.

Other known negative electrode materials include pure metallic materials and pure non-metallic materials which form composites with lithium. For example, composition formulae of compounds of tin (Sn), silicon (Si) and zinc (Zn) with the maximum amount of lithium are $Li_{22}Sn_5$, $Li_{22}Si_5$, and LiZn respectively. Within the range of these composition formulae, metallic lithium does not normally deposit to form dendrites. Thus, an internal short circuit due to dendrite formation does not occur. Furthermore, electrochemical capacities between these compounds and each element in pure form mentioned above is respectively 993 mAh/g, 4199 mAh/g and 410 mAh/g; all larger than the theoretical capacity of graphite.

As an example of other compound negative electrode materials, the Japanese Patent Laid-Open Publication No. H07-240201 discloses a non-metallic siliside comprising transition elements. The Japanese Patent Laid-Open Publication No. H09-63651 discloses negative electrode materials which are made of inter-metallic compounds comprising at least one of group 4B elements, phosphorus (P) and antimony (Sb), and have a crystal structure of one of the $CaF_2$ type, the ZnS type and the AlLiSi type.

However, the foregoing high-capacity negative electrode materials have the following problems. Negative electrode materials of pure metallic materials and pure non-metallic materials which form compounds with lithium have inferior charge/discharge cycle properties compared with carbon negative electrode materials. The reason for this is assumed to be destruction of the negative electrode materials caused by their increase and decrease in volume.

On the other hand, unlike the foregoing materials in pure form, the Japanese Patent Laid-Open Publication No. H07-240201 and the Japanese Patent Laid-Open Publication No. H09-63651 disclose negative electrode materials which comprise non-metallic silisides composed of transition elements and inter-metallic compounds including at least one of group 4B elements, P and Sb, and have a crystal structure of one of the $CaF_2$ type, the ZnS type and the AlLiSi type, as negative electrode materials with an improved cycle life property.

Batteries using the negative electrode materials of the non-metallic silisides composed of transition elements disclosed in the Japanese Patent Laid-Open Publication No. H07-240201 have an improved charge/discharge cycle property when compared with lithium metal negative electrode materials (considering the capacity of the batteries according to an embodiment and a comparative example at the first cycle, the fiftieth cycle and the hundredth cycle). However, when compared with a natural graphite negative electrode material, the increase in the capacity of the battery is only about 12%.

The materials disclosed in the Japanese Patent Laid-Open Publication No. H09-63651 have a better charge/discharge cycle property than a Li—Pb alloy negative electrode material (as shown in tests between an embodiment and a comparative example), and have a larger capacity compared with a graphite negative electrode material. However, the discharge capacity decreases significantly, up to the 10~20th charge/discharge cycles. Even with $Mg_2Sn$, which is considered to be better than any of the other materials, the discharge capacity decreases to approximately 70% of the initial capacity after about the 20th cycle.

Examples of positive electrode active materials for the non-aqueous electrolyte secondary batteries, which are capable of intercalating and de-intercalating lithium ions, include a lithium transition metal composite oxide with high charge/discharge voltage such as $LiCoO_2$, disclosed in the Japanese Patent Laid-Open Publication No. Other materials such as S55-136131, and $LiNiO_2$, disclosed in the U.S. Pat. No. 4,302,518, aim at even a higher capacity. Examples of such positive electrode active materials further include composite oxides comprising a plurality of metallic elements and lithium such as $Li_yNi_xCo_{1-x}O_2$, disclosed in the Japanese Patent Laid-Open Publication No. S63-299056, and $Li_xM_y$-$N_zO_z$ (M is one of Fe, Co and Ni, and N is one of Ti, V, Cr and Mn) disclosed in the Japanese Patent Laid-Open Publication No. H04-267053.

Active research has been conducted on $LiNiO_2$ since the supply of Ni, its raw material, is stable and inexpensive, and it is expected to achieve a high capacity.

It has been known that with the thus far disclosed positive electrode active materials, especially $Li_yNi_xM_{1-x}O_2$ (M is at least one material selected from a group consisting of cobalt (Co), manganese (Mn), chromium (Cr), iron (Fe), vanadium (V), and aluminum (Al); and x is $1 \geq x \geq 0.5$) there are significant differences in charge/discharge capacity between the initial charging (de-intercalation reaction of lithium) and discharging (intercalation reaction of lithium) in the voltage region usually used as a battery (4.3V–2V against Li)( see, for example, A. Rougier et al., Solid State Ionics 90, 83 (1996)). FIG. 2 shows a schematic view of the electric potential behavior at the initial charge and discharge of the positive electrode and the negative electrode of a battery in which composite particle materials with the same theoretical capacity as the foregoing positive electrode materials are used in the negative electrode.

In FIG. 2, (A–B) is the amount of electricity of the positive electrode charged during the first cycle, (B–C) is the discharge capacity of the positive electrode at the first cycle, and (C–A) is the irreversible capacity of the positive electrode. (A'–B') is the amount of electricity of the negative electrode charged during the first cycle, which is equal to (A–B) of the positive electrode. (B'–C') is the potential discharge capacity of the negative electrode at the first cycle, and (C'–A') is the irreversible capacity of the negative electrode. The potential discharge capacity of the negative electrode at the first cycle (B'–C') is larger than the discharge capacity of the positive electrode at the first cycle (B–C) by the amount of (C'–D). Therefore, the initial discharge capacity of the battery is determined by the initial discharge capacity of the positive electrode (B–C). In the charge/discharge cycles that follow from the second cycle onwards, a reversible reaction occurs between (B–C) in the positive electrode and (B'–D) in the negative electrode, which is the same capacity as (B–C). Thus, an amount of lithium corresponding to the capacity of the negative electrode (C'–D), remains in the negative electrode as "dead lithium" which can not contribute to the charge/discharge reaction of the battery, thereby lowering the capacity of the battery.

When the theoretical capacity of the positive electrode and the negative electrode are adjusted by increasing the amount of active materials in the positive electrode so that the first discharge capacity of the positive electrode and the negative electrode becomes the same after the first charging, the negative electrode is over charged by the amount of (C'–D) equal to the amount of "dead lithium" in the negative electrode, namely the amount corresponding to the difference between the irreversible capacity of the positive electrode (C–A) and the negative electrode (C'–A').

However, the reversible charge capacity of the negative electrode active material is limited. If charging is conducted beyond that limit, lithium metal deposits on the surface of the negative electrode plate. The deposited lithium reacts with the electrolytic solution and becomes inert, thereby lowering the charge/discharge efficiency and thus lowering the cycle life properties.

Conversely, if the negative electrode capacity is significantly larger than the positive electrode capacity, increase of the capacity of the batteries becomes harder due to the excess negative electrode material contained in the negative electrode.

To solve these problems, the Japanese Patent Laid-Open Publication No. H05-62712 discloses a capacity ratio of the positive electrode to the negative electrode. Calculations made in this disclosure are based on the total capacity. However, in actual use, influences of such factors as strength of charging current, charging voltage, and materials used in the positive electrode and the negative electrode are significant. Thus, when a battery is charged slowly (over a long time), just regulating the ratio of the total capacity as disclosed in the Japanese Patent Laid-Open Publication No. H05-62712 is adequate. However, if the speed of charging is important, as it has been in high-speed charging and pulse charging in recent years, the process is inadequate.

The speed of charging is largely influenced by the specific surface area of the materials. Needless to say, a large specific surface area is more advantageous in terms of charging speed, however, if the specific surface area is excessively large, the capacity retention rate deteriorates markedly due to the generation of gas. Thus, the specific surface area needs to be kept within an appropriate range. With regard to this point, for the batteries using carbon material, favorable ranges of the specific surface area are suggested in the Japanese Patent Laid-Open Publication No. H04-242890 and the Japanese Patent Laid-Open Publication No. S63-276873. The ranges are, in the case of the former, 0.5–10 $m^2/g$ and the latter, 1.0 $m^2/g$ or larger. The Japanese Patent Laid-Open Publication No. H04-249073 and the Japanese Patent Laid-Open Publication No. H06-103976 disclose favorable ranges for the specific surface area of the positive electrode materials, that is, in the case of the former, 0.01–3 $m^2/g$ and the latter, 0.5–10 $m^2/g$.

However, when considering a performance of a battery, the balance of intercalation and de-intercalation capacity between the positive electrode and the negative electrode is important, thus merely controlling the capacity of one element separately is meaningless. In other words, regulating the specific surface area of the positive electrode and the negative electrode independently, as has been conducted conventionally, is not satisfactory.

The present invention aims to address the problems of conventional batteries described thus far.

SUMMARY OF THE INVENTION

The present invention relates to non-aqueous electrolyte secondary batteries comprising an positive electrode and a negative electrode capable of intercalating and de-intercalating lithium, a non-aqueous electrolyte and separators or solid electrolytes. The negative electrode is characterized by its main material which uses composite particles constructed in such a manner that at least part of the surrounding surface of nuclear particles, containing at least one of tin (Sn), silicon (Si) and zinc (Zn) as a constituent element, is coated with a solid solution or an inter-metallic compound composed of an element included in the nuclear particles and at least one element (exclusive of the elements included in the nuclear particles) selected from transition elements, elements of group 2, group 12, group 13 and group 14 (exclusive of carbon) of the Periodic Table.

To improve the performance of the battery, the composite particles mentioned above can include at least one trace element selected from iron, lead and bismuth. Amounts of the trace element to be added is between 0.0005 wt % and 0.002 wt % or more.

The porosity of the mixture layer at the negative electrode is 10% or more and 50% or less. The porosity of the mixture layer is defined as:

total volume of the space area of the mixture layer/total volume of the mixture layer×100%.

The present invention maintains the most appropriate amount of the electrolytic solution between the electrode plates by setting it at about 0.1 ml to about 0.4 ml per 1 gram of the total weight of the positive electrode and the negative electrode materials in the battery casing.

The thickness of the separators located in between the positive electrode and the negative electrode of the battery of the present invention is about 15 μm to 40 μm. The piercing strength of the separators is 200 g or more.

Fluorinated carbon compounds defined as $(C_xF)$ n ($1 \leq x \leq 20$) or metallic compounds which can be reduced electrochemically to metal by charging are added to the negative electrode materials of the battery of the present invention.

Regarding the battery of the present invention, the ratio of (specific surface area of the negative electrode material) to (specific surface area of the positive electrode material) is set at 0.3–12. In the same manner, when R1 is a diameter of a semi-circle arc plotted on a complex plane by measuring impedance at a range of frequencies between 10 kHz and 10 MHz using an electrochemical battery in which an positive electrode plate is set as an active electrode and lithium metal is used in the other electrode; and R2 is a diameter of a semi-circle arc plotted on a complex plane by measuring impedance at a range of frequencies between 10 kHz and 10 MHz using an electrochemical battery in which a negative electrode plate is set as an active electrode and lithium metal is used in the other electrode, the value of R2/R1 is between 0.01–15. Based on the value of R2/R1, the specific surface area of the negative electrode material and the positive electrode material is estimated.

The foregoing construction suppresses an internal short circuit between the positive electrode and the negative electrode caused by expansion of the negative electrode material, thereby providing a high capacity battery with a superior charge/discharge cycle property suitable for a high-speed charging.

DETAILED DESCRIPTION OF THE PREFERRED EMBODIMENTS

Figure 1:
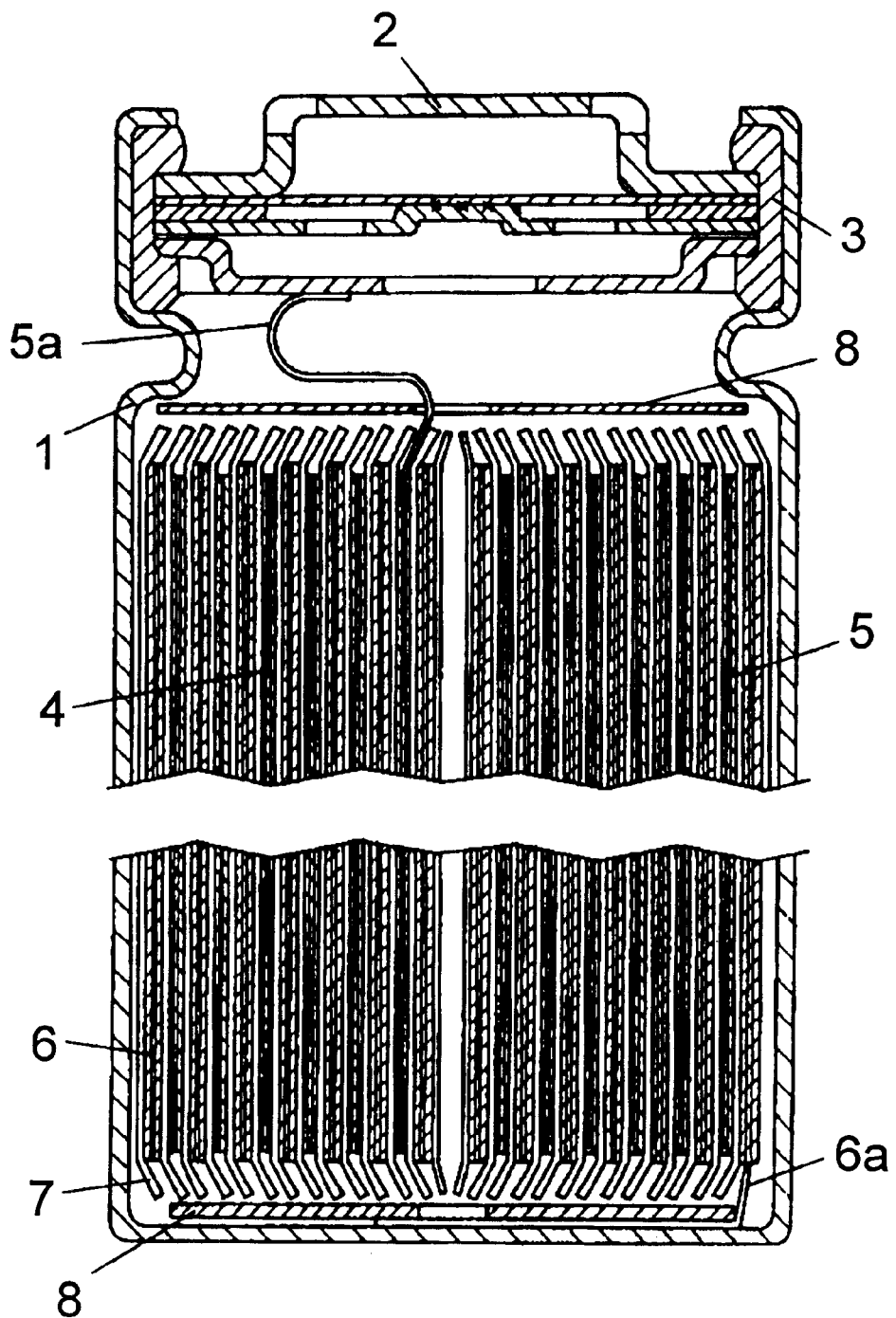
FIG. 1 shows a vertical cross section of a cylindrical battery of the present invention.
Figure 2:
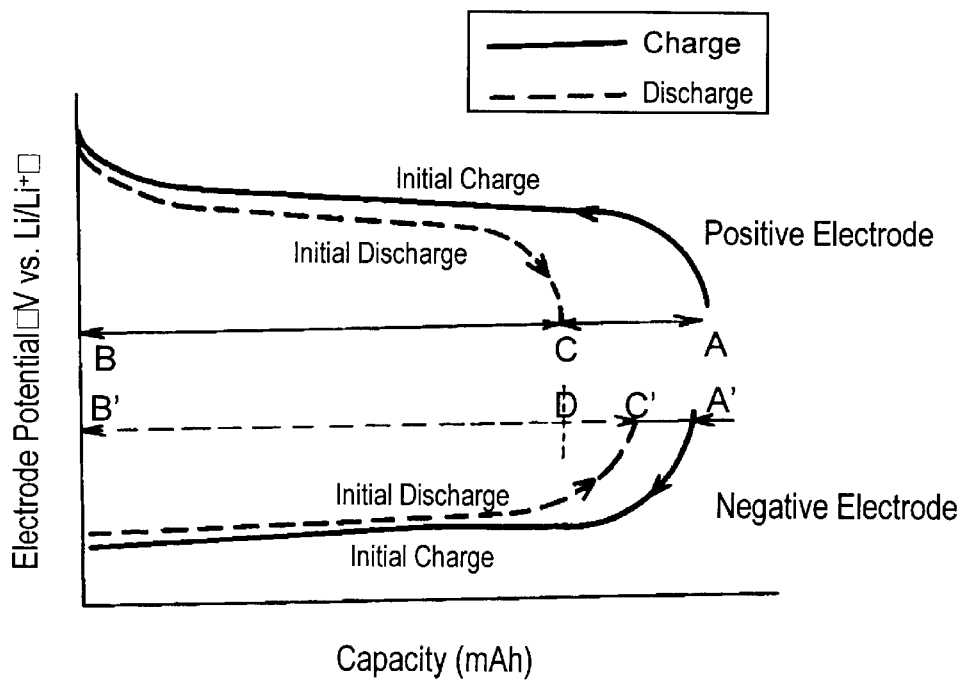
FIG. 2 shows a schematic view of charge and discharge during the first cycle of a conventional lithium secondary battery.

In the present invention, composite particles whose nuclear particles composed of solid phase A are coated with solid phase B over the whole surface or part of the surface, are used as a negative electrode material. The solid phase A contains at least one of tin, silicon and zinc as a constituent element. The solid phase B is composed of a solid solution or inter-metallic compounds composed of at least one of tin, silicon and zinc and at least one element (exclusive of the foregoing constituent elements) selected from a group comprising elements of group 2, transition elements, elements of group 12, group 13 and group 14 (exclusive of carbon) of Periodic Table. Hereinafter, the foregoing negative electrode materials are called "composite particles". When the composite particles are used as a negative electrode material, the solid phase B helps to suppress expansion and shrinkage of the solid phase A caused by charging and discharging, thereby achieving a negative electrode material with superior charge/discharge cycle properties.

It can be considered that the solid phase A of the negative electrode material of the present invention mainly contributes to a higher charge/discharge capacity since it contains at least one of Sn, Si and Zn. The solid phase B which coats the whole or part of the surrounding surface of the nuclear particles comprising the solid phase A, contributes to improvement of the charge/discharge cycle properties. The amount of lithium contained in the solid phase B is normally less than the metal, solid solution or inter-metallic compound.

In other words, the negative electrode material used in the present invention is constructed such that particles including at least one of high-capacity Sn, Si and Zn as a constituent element, are coated with the solid solution or the inter-metallic compounds which are resistant to pulverization. The solid solution or the inter-metallic compounds in the coating layer prevent significant changes in crystal structure, namely changes in volume of the nuclear particles caused by electrochemical intercalating and de-intercalating of lithium, thereby restricting pulverization of nuclear particles. However, the total volume of the coated particles changes to some extent.

Due to this volume change, as the negative electrode materials swell during charging, the negative electrode materials or conductive materials on the surface of the negative electrode plate, in some cases, partly penetrate through the separators located in between the positive electrode and the negative electrode, thus causing a micro short circuit between the positive electrode and the negative electrode. The change in volume of the negative electrode materials caused by charging and discharging of the present invention is larger than that of graphite materials. As such, it occurs more often compared with conventional batteries using graphite materials in the negative electrode.

To solve this problem, the inventors of the present invention found that if the thickness of the separator is set at 15 μm or more to 40 μm or less, and the piercing strength of it is 200 g or more, a micro short circuit between the positive electrode and the negative electrode caused by the swelling of the negative electrode materials during charging is restricted, thus achieving a good charge/discharge cycle property.

In other words, if the thickness of the separator between the positive electrode and the negative electrode is 15 μm or less, the negative electrode materials or conductive materials on the surface of the negative electrode plate partly penetrate through the separators located in between the positive electrode and the negative electrode, thus causing a micro short circuit between the positive electrode and the negative electrode. On the other hand, if the thickness of the separator is 40 μm or more, the volume of the separators within the casing of the battery increases while the volume of the fillings in the positive electrode and the negative electrode needs to be reduced. As a result, the initial charge/discharge capacity lowers.

The present invention specifies the piercing strength of the separator, which is an index of the physical characteristics of the separator. The measuring method of the piercing strength is described below:

cut a separator into a 50 mm×50 mm piece, then place it onto a jig fixing it at 5 mm from both sides;

press the center of the separator at a speed of 2 mm/sec with a needle of 1 mm in diameter and with a tip of 0.5R; and measure the value of the maximum load at breaking point.

The value of the maximum load is the piercing strength. When the piercing strength measured by this method is 200 g or less, even if the thickness of the separator is 15 μm or more, the negative electrode materials swell during charging, thus causing a micro short circuit between the positive electrode and the negative electrode. As a result, a good charge/discharge cycle property can not be achieved.

Porous thin films having a large ion permeability, a predetermined mechanical strength and insulation properties are used as a separator of the present invention. It is desirable that the separators close their pores at a predetermined temperature or higher so that the internal resistance of the battery is increased. Separators are required to have an organic solvent resistance and a hydrophobic property. Therefore, polypropylene, polyethylene and their copolymers such as olefin polymers, as well as glass fiber sheet and both non-woven and woven fabrics of glass fiber are used as materials for the separators. The diameter of the pore of the separators is desirably set within the range through which positive electrode and negative electrode materials separated from electrode sheets, binding materials, and conductive materials can not penetrate. Such a desirable range is, for example, 0.01–1 μm. The porosity is determined by the permeability of electrons and ions, material and membrane thickness, in general however, it is desirably 30–80%.

The amount of non-aqueous electrolytic solution (hereinafter, electrolyte) against 1 g of total weight of the positive electrode and the negative electrode materials which can intercalate and de-intercalate lithium within the casing of the battery, is desirably between 0.1 ml and 0.4 ml.

If the electrolyte is between 0.1 ml and 0.4 ml, the electrolyte can be sufficiently maintained over the entire surface of both the positive electrode and the negative electrode, even when the amount of the non-aqueous electrolytic solution is changed due to expansion and shrinkage of the negative electrode materials. Thus, a good charge and discharge cycle property can be obtained.

On the other hand, if the amount of the electrolyte is 0.1 ml/g or less, the electrolyte fails to adequately cover the negative electrode. The current density during charging and discharging differs significantly depending on whether or not the part of the negative electrode where the current is flowing, is adequately covered by the electrolyte. In the part of the negative electrode where the electrolyte adequately penetrates, excess lithium ions contribute to electrode reaction, increasing the charging capacity of the negative electrode material. When the negative electrode materials react with lithium, their structure changes. Thus, good charge/discharge cycle properties can not be expected.

If the amount of the electrolyte in the casing of the battery is 0.4 ml or more, excessive amounts of electrolyte overflows from between the electrodes, increasing the internal pressure of the battery which in turn causes a leakage of the electrolyte. Thus, it is not desirable.

By adding a trace amount of impure elements to the negative electrode materials of the battery of the present invention, the retention rate of the discharge capacity after charge/discharge cycles can be improved. The retention rate of the discharge capacity can also be improved by adding fluorinated carbon compounds or metallic compounds which can be reduced electrochemically to metal by charging, to the negative electrode materials. This improvement in the retention rate is between 1 and 8%. It sounds like just a small improvement. However, considering the fact that the retention rate has already reached over 90%, this improvement is significant from an industrial perspective. That means, 1% improvement actually corresponds to 10% improvement against the remaining 10% yet to be improved, and in the same manner, 8% means 80%.

Moreover, in the field of the energy technology to which the present invention relates, 1% improvement in efficiency means, a significant reduction in energy consumption world wide.

In the battery of the present invention, the porosity of the mixture layer composing the negative electrode materials is set at about 10% or more and about 50% or less. The reason why the porosity is set in that range is as follows. If the porosity is 10% or less, the density of the negative electrode materials can be increased. However, the electrolytic solution does not penetrate into the negative electrode sufficiently. Thus, the negative electrode materials fail to be used adequately, resulting in a deteriorated charge/discharge cycle property. Especially in the case of the negative electrode materials of the present invention, any increase in the volume of the particles is markedly restricted since the solid phase A is covered with the solid phase B, however, the volume still increases by tens of a percentage. This has a significant influence on the battery charge/discharge cycle property. Compared with carbon materials which do not increase in volume, the present invention requires a larger space between the electrodes. In other words, when the porosity is low, the volume of the space in the negative electrode decreases remarkably when the negative electrode materials intercalate lithium, thereby reducing the retained electrolyte. Furthermore, swelling and shrinking of the electrode plates themselves may cause damage to the mixture layer. On the other hand, if the porosity is 50% or more, although the use rate of the negative electrode materials improves due to a better penetration of the electrolytic solution, the absolute amount of the negative electrode materials decrease. Thus, a battery with a higher capacity than a battery using carbon materials in the negative electrode can not be achieved.

As a method to adjust the porosity of the mixture layer of the negative electrode, a pressure roller can be used. The porosity can also be adjusted by adding and controlling the amount of a pore forming material.

Regarding the battery of the present invention, the value of the (specific surface area of the negative electrode material)/(specific surface area of the positive electrode material) is set at 0.3–12. In the same manner, when R1 is a diameter of a semi-circle arc plotted on a complex plane by measuring impedance at a range of frequencies between 10 kHz and 10 MHz using an electrochemical battery in which an positive electrode plate is used as an active electrode and lithium metal is used in the other electrode; and R2 is a diameter of a semi-circle arc plotted on a complex plane by measuring impedance at a range of frequencies between 10 kHz and 10 MHz using an electrochemical battery in which a negative electrode plate is set as an active electrode and lithium metal is used in the other electrode, the value of R2/R1 is between 0.01–15. If the value of (specific surface area of the negative electrode material)/(specific surface area of the positive electrode material) is not less than 12, the electric potential of the positive electrode rises when the battery is charged fully, which promotes the production of gas. Thus, when the battery is charged and stored, its capacity decreases significantly. Conversely, when the value is not more than 0.3, lithium deposits on the surface of the negative electrode materials during high-speed charging, and the cycle life of the battery is degraded significantly.

Since binders and conductive materials are used when electrode materials are used as positive electrode and negative electrode plates, the value of (specific surface area of the negative electrode material)/(specific surface area of the positive electrode material) may not be enough to measure the properties of the battery. In such a case, the charge/discharge properties per unit area of the positive electrode and the negative electrode plates can be estimated by measuring impedance of the positive electrode and the negative electrode. Thus, by regulating the ratio of the diameters of semi-circle arcs plotted on the complex planes to show the result of measuring, the charge/discharge properties per unit area can be estimated.

In short, when the value of R2/R1 is not more than 0.01, the electric potential of the positive electrode rises when the battery is fully charged, promoting the production of gas. Thus, when the battery is charged and stored, its capacity decreases significantly. Conversely, when the value is not more than 15, lithium deposits on the surface of the negative electrode materials during high-speed charging, and the cycle life of the battery is degraded significantly.

The materials used in the battery of the present invention are described in detail below.

The positive electrode and the negative electrode of the battery of the present invention are constructed by coating a current collector with a composite mixture which includes, as main constituents, the positive electrode active materials and the negative electrode materials capable of electrochemically and reversibly intercalating and de-intercalating lithium ions, and conductive materials as well as binders.

The following is a manufacturing method of composite particles used for the negative electrode materials.

In one manufacturing method of the composite materials, a fused mixture of elements to be included in the composite particles at a predetermined composition ratio is quenched and solidified by dry-spraying, wet-spraying, roll-quenching or turning-electrode method. The solidified material is treated with heat lower than the solid-line temperature of a solid solution or inter-metallic compounds. The solid line temperature is determined by the composition ratio. The process of quenching and solidifying of the fused mixture allows the solid phase A to deposit, and at the same time, allows the solid phase B, which coats part of or the whole surface of the solid phase A, to deposit. The heat treatment following the foregoing method enhances evenness of the solid phase A and the solid phase B. Even when the heat treatment is not conducted, composite particles suitable for the present invention can be obtained. Apart from the quenching method mentioned above, other methods are applicable providing they can quench the fused mixture rapidly and adequately.

In another manufacturing method, a layer of deposits comprising essential elements in forming solid phase B is formed on the surface of powder of the solid phase A. The layer is treated at temperatures lower than the solid line. This heat treatment allows constituent elements within the solid phase A to disperse throughout the deposit layer to form the solid phase B as a coating layer. The deposit layer can be formed by plating or by a mechanical alloying method. In the case of the mechanical alloying method, the heat treatment is not necessary. Other methods can also be used on the condition that they can form the surrounding deposit layer.

As a conductive material for the negative electrode, any electronic conduction materials can be used. Examples of such materials include graphite materials including natural graphite (scale-like graphite), synthetic graphite and expanding graphite; carbon blacks such as acetylene black, Ketzen black (highly structured furnace black), channel black, furnace black, lamp black and thermal black; conductive fibers such as carbon fibers and metallic fibers; metal powders such as copper and nickel; and organic conductive materials such as polyphenylene derivatives. These materials can be used independently or in combination. Among these conductive materials, synthetic graphite, acetylene black and carbon fibers are especially favorable.

The amount of conductive additives is not specifically defined, however, 1–50 wt %, especially 1–30% of the negative electrode materials is desirable. As negative electrode materials (composite particles) of the present invention are conductive themselves, even if conductive materials are not added, the battery can actually function. Therefore, the battery has more room available to contain more composite particles.

Binders for the negative electrode can be either thermoplastic resin or thermosetting resin. Desirable binders for the present invention includes the following materials; polyethylene, polypropylene, poly-tetrafluoroethylene (PTFE), poly-vinylidene fluoride (PVDF), styrene—butadiene rubber, a tetrafluoroethylene—hexafluoropropylene copolymer (FEP), a tetrafluoroethylene—perfluoro-alkyl-vinyl ether copolymer (PFA), a vinyliden fluoride—hexafluoropropylene copolymer, a vinyliden fluoride—chlorotrifluoroethylene copolymer, a ethylene—tetrafluoroethylene copolymer (ETFE), poly chlorotrifluoroethylene (PCTFE), a vinyliden fluoride—pentafluoropropylene copolymer, a propylene—tetrafluoroethylene copolymer, a ethylene—chlorotrifluoroethylene copolymer (ECTFE), a vinyliden fluoride—hexafluoropropylene—tetrafluoroethylene copolymer, a vinyliden fluoride perfluoro-methyl vinyl ether—tetrafluoroethylene copolymer, an ethylene—acrylic acid copolymer or its Na+ ion crosslinking body, an ethylene—methacrylic acid copolymer or its Na+ ion crosslinking body, a methyl acrylate copolymer or its Na+ ion crosslinking body, and an ethylenemethyl methacrylate copolymer or its Na+ ion crosslinking body. Favorable materials among these materials are styrene butadiene rubber, polyvinylidene fluoride, an ethylene—acrylic acid copolymer or its Na+ ion crosslinking body, an ethylene—methacrylic acid copolymer or its Na+ ion crosslinking body, a methyl acrylate copolymer or its Na+ ion crosslinking body, and an ethylene-methyl methacrylate copolymer or its Na+ ion crosslinking body.

As a negative electrode current collector, any electronic conductors may be used on the condition that they do not chemically change in the battery. For example, stainless steel, nickel, copper, titanium, carbon, conductive resin, as well as copper and stainless steel of which the surface is coated with carbon, nickel or titanium can be used. Especially favorable materials are copper and copper alloys. Surfaces of these materials may be oxidized. It is desirable to treat the surface of the current collector to make it uneven. Usable forms of the foregoing materials as the current collector include a foil, a film, a sheet, a mesh sheet, a punched sheet a lath form, a porous form, a foamed form and a fibrous form. The thickness is not specifically defined however, normally those of 1~500 $\mu$m in thickness are used.

As positive electrode active materials, lithium compounds or non-lithium containing compounds can be used. Such compounds include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$ (M is at least one of Na, Mg, Sc, Y, Mn, Fe, Co, Ni, Cu, Zn, Al, Cr, Pb, Sb and B, and x=0–1, Y=0–0.9, z=2.0–2.3). The value of x is the value before charging and discharging, thus it changes along with charging and discharging. Other usable positive electrode materials include transition metal chalcogenides, a vanadium oxide and its lithium compounds, a niobium oxide and its lithium compounds, a conjugate polymer using organic conductive materials, and Chevrel phase compounds. It is also possible to use a plurality of different positive electrode materials in a mixture. The average diameter of particles of the positive electrode active material is not specifically defined, however, the diameter is desirably about 1–30 µm.

Conductive materials for the positive electrode can be any electronic conductive material on the condition that it does not chemically change within the range of charge and discharge electric potentials of the positive electrode materials in use. Examples of such materials include graphite materials including natural graphite (scale-like graphite) and synthetic graphite; carbon black materials such as acethylene black, Ketzen black, channel black, furnace black, lamp black and thermal black; conductive fibers such as carbon fibers and metallic fibers; metal powders such as fluorocarbon and aluminum; conductive whiskers such as a zinc oxide and potassium titanate, conductive metal oxides such as a titanium oxide, and organic conductive materials such as polyphenylene derivatives. These materials can be used independently or in a mixture. Among these conductive materials, synthetic graphite and acetylene black are especially favorable.

Amount of the conductive materials to be added is not specifically defined, however, 1–50 wt %, especially 1–30% of the positive electrode materials is desirable. In the case of carbon and graphite, 2–15 wt % is especially favorable.

Binders for the positive electrode can be either thermoplastic resin or thermosetting resin. The binders for the negative electrode mentioned earlier can be used preferably, however, PVDF and PTFE are more favorable than the others.

Current collectors for the positive electrode of the present invention can be any electronic conductors on the condition that it does not chemically change within the range of charge and discharge electric potentials of the positive electrode materials in use. For example, the current collectors for the negative electrode mentioned earlier may be used preferably. The thickness of the current collectors is not specifically defined, however, those of about 1–500 µm in thickness are used.

As electrode mixtures for the positive electrode and the negative electrode plates, conductive materials, binders, fillers, dispersants, ionic conductor, pressure enhancers, and other additives can be used. Any fiber materials which does not change chemically in the battery can be used as fillers. In general, olefin polymers such as polypropylene and polyethylene, and fibers such as glass fiber and carbon fiber are used as fillers. The amount of the filler to be added is not specifically defined however, it is desirably 0–30 wt % of the electrode binders.

As for the constitution of the positive electrode and the negative electrode, it is favorable that at least the surface of the negative electrode where the negative electrode mixture is applied is facing the surface of the positive electrode where positive electrode mixture is applied.

The electrolyte is composed of non-aqueous solvent and lithium salts dissolved therein. Examples of non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), methyl ethyl carbonate (EMC), and dipropylene carbonate (DPC); aliphatic carboxylates such as methyl formate, methyl acetate, methyl propionate, and ethyl propionate;γ-lactones such as γ-butyrolactone; acyclic esters such as 1,2-dimethoxyethane (DME), 1,2-diethoxyethane (DEE), and ethoxymethoxyethane (EME); cyclic esters such as tetrahydrofuran and 2-methyltetrahydrofuran; and non-protonic organic solvents such as dimethyl sulfoxide, 1,3-dioxolane, formamide, acetamide, dimethylformamide, dioxolane, acetonitrile, propyonitrile, nitromethane, ethylmonoglime, triester of phosphoric acid, trimethoxy methane, dioxolane derivatives, sulfolane, methyl sulfolane, 1,3-dimethyl-2-imidazolidine, 3-methyl-2-oxazolidinone, propylene carbonate derivatives, tetrahydrofuran derivatives, ethyl ether, 1,3-propane saltane, anisole, dimethyl sulfoxide and N-methyl pyrolidon, These solvents are used independently or as a mixture of two or more solvents. Mixtures of cyclic carbonate and acyclic carbonate, or cyclic carbonate, acyclic carbonate and aliphatic carboxylate are especially favorable.

As lithium salts which dissolve into the foregoing solvents include $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium salts of lower aliphatic carboxylic acid, LiCl, LiBr, LiI, chloroborane lithium, 4-phenil boric acid, and an imide group. These lithium salts can be dissolved in the non-aqueous solvents mentioned earlier individually or as a mixture of two or more to be used as an electrolyte. It is especially favorable to include $LiPF_6$ in the electrolyte.

Especially favorable non-aqueous electrolytic solution of the present invention include at least EC and EMC, and as a supporting salt, $LiPF_6$. The amount of the electrolyte to be added to the battery is not specifically defined. It can be determined according to the amount of positive electrode materials and negative electrode materials. The amount of the supporting electrolyte dissolved in the non-aqueous solvent is preferably 0.2–2 mol/l, especially 0.5–1.5 mol/l is favorable.

Instead of an electrolyte, the following solid electrolytes which are categorized into inorganic solid electrolytes and organic solid electrolytes can also be used.

Among inorganic solid electrolytes, lithium nitrides, lithium halides, and lithium oxides are well known. Among them, $Li_4SiO_4$, $Li_4SiO_4$—LiI—LiOH, $xLi_3PO_4$—(1−x)$Li_4SiO_4$, $Li_2SiS_3$, $Li_3PO_4$—$Li_2S$—$SiS_2$ and phosphorus sulfide compounds are effective.

Effective organic solid electrolytes include polymer materials such as derivatives, mixtures and complexes of polyethylene oxide, polypropylene oxide, polyphosphazene, polyaziridine, polyethylene sulfide, polyvinyl alcohol, polyvinylidene fluoride, polyhexafluoropropylene.

It is effective to add other compounds to the electrolyte in order to improve discharge and charge/discharge properties. Such compounds include triethyl phosphate, triethanolamine, cyclic ethers, ethylene diamine, n-grime, pyridine, triamide hexaphosphate, nitrobenzene derivatives, crown ethers, quaternary ammonium salt, and ethylene glycol di-alkyl ethers.

It is also possible to construct a batteries such that polymer materials, which absorb and retain an organic electrolyte comprising solvents and lithium salts dissolved in the solvents, are included in the positive electrode and the negative electrode binding materials, and porous separators comprising polymers which can absorb and retain an organic electrolyte is disposed integrally with the positive electrode and the negative electrode. Any material which can absorb and retain organic electrolytic solution can be adopted as the polymer material. Among them, a copolymer of vinylidene fluoride and hexafluoropropylene is especially favorable.

Fluorinated carbon compounds added to the negative electrode materials are defined as $(C \times F)n$ $(1 \leq x < 20)$. Desirably, these fluorinated carbon compounds irreversibly react with lithium ions in a reduction reaction. An especially high effect can be achieved when a fluorinated compounds of or a mixture of one or more following materials; thermal black, acetylene black, furnace black, vapor phase grown carbon fibers, thermally decomposed carbons, natural graphite, synthetic graphite, meso-phase carbon micro beads, petroleum cokes, coal cokes, petroleum carbon fibers, coal carbon fibers, charcoal, activated carbon, glassy carbon, rayon carbon fibers, and PAN carbon fibers, is used.

The amount of the carbon compounds to be added is desirably the same as the difference in irreversible capacities of the positive electrode and the negative electrode. Since the electrochemical equivalents of the common fluorinated carbons $(CF)_n$ and $(C_2F)_n$ are respectively 864 mAH/g and 623 mAH/g, when the added amount of carbon compounds is 0.2%~15% of the total amount of the composite particle materials and carbon compounds, the carbon compounds work most effectively.

Metallic compounds added to the negative electrode materials, and which can be reduced electrochemically to a metal in a reduction reaction, include metallic oxides, metallic sulfides, metallic selenides, and metallic tellurides which react with lithium ions in a reduction reaction within a range of electric potentials between the positive electrode and the negative electrode.

As metallic oxides, at least one can be selected from a group comprising $Ag_2O$, $PbO$, $NiO$, $Ni_2O_3$, $CoO$, $Co_2O_3$, $Co_3O_4$, $CuO$, $Cu_2O$, $Bi_2O_3$, $Sb_2O_3$, $Cr_2O_3$, $MnO_2$ and $FeO_4$.

As metallic sulfides, at least one can be selected from a group comprising $Ag_2S$, $PbS$, $NiS$, $Ni_2S$, $Ni_3S_4$, $CoS$, $Co_2S_3$, $Co_3S_4$, $CuS$, $Cu_2S$, $Bi_2S_3$, $Sb_2S_3$, $Sb_2S_4$, $Sb_2S_5$, $CrS$, $Cr_2S_3$, $MnS$, $Mn_3S_4$, $MnS_2$ and $FeS$, $Fe_2S_3$, $FeS_2$, $Mo_2S_3$ and $MoS_2$.

As metallic selenides, at least one can be selected from a group comprising $Ag_2Se$, $PbSe$, $Co_2Se_3$, $Co_3Se_4$, $CuSe$, $Cu_2Se$, $Bi_2Se_3$, $Sb_2Se_3$, $Sb_2Se_5$, and $Cr_2Se_3$.

As metallic tellurides, at least one can be selected from a group comprising $Ag_2Te$, $PbTe$, $NiTe$, $Ni_2Te_3$, $CuTe$, $Cu_2Te$, $Bi_2Te_3$ and $Sb_2Te_3$.

Needless to say, a mixture of these oxides, sulfides, selenides and tellurides can also be used. These compounds need to be added just enough to consume irreversible capacity of the positive electrode. In general, such amount is desirably 0.2%–20% of the total amount of the composite particles and the foregoing compounds.

With these compounds, if for example, NiS is used, metallic nickel is formed in a reduction reaction defined by the following formula;

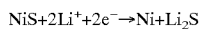

$$NiS+2Li^{+}+2e^{-} \rightarrow Ni+Li_2S$$

The nickel formed in the above reaction is chemically and electrochemically stable within the range of the electric potential in which the negative electrode active materials are charged and discharged. During discharge of the negative electrode, the nickel is not oxidized. The reaction is irreversible and the nickel maintains its metal state. Since metallic compounds form metals during the initial charging, conductivity within the negative electrode plate improves significantly. Thus, internal resistance and polarization in the negative electrode are reduced, thereby achieving higher capacity.

When the foregoing additives are used, the negative electrode additives are allowed to be charged with and thus consume an excess of the irreversible capacity of the positive electrode over that of the negative electrode, and thus consumes that amount. Therefore, use of the additives achieves a battery with even higher energy density and better cycle properties. The products of the reduction reaction do not form compounds with lithium afterwards, thus the reaction is irreversible. It is confirmed that, in the case of the metallic oxides, metallic sulfides, metallic selenides, and metallic tellurides of the present invention, reactions are irreversible thus lithium de-intercalating reaction does not occur. This is a remarkable difference from conventional compounds containing lithium used as negative electrode additives and is characteristic of the present invention.

The amount of electricity charged when reacted with lithium in a reduction reaction can be measured in the following steps:
  add acetylene black about 30% by weight of the compound (for example, NiS) to be added,
  make a pellet by applying a pressure of 250 kg/cm$^2$ after adding acetylene black, and fix it on a stainless current collector which then functions as an active electrode,
  use metallic lithium on the other electrode as well as on a reference electrode, and
  discharge constant current to the electrodes with lithium until their voltage reaches 0V and then measure the amount of electricity.

The most favorable electrolyte for measuring is the one used in the actual battery. The current density for charging is desirably not more than 0.1 mA/cm$^2$.

The best result of the present invention was obtained when lithium-containing metallic oxides based on lithium-containing nickel oxides were used as a positive electrode material of which the charge/discharge efficiency at the first cycle is between 75–95%.

FIG. 1 shows a vertical cross section of a cylindrical battery of the present invention. In FIG. 1, an positive electrode plate 5 and negative electrode plate 6 are spirally rolled a plurality of times via separators 7, and placed In a battery casing 1. Coming out from the positive electrode plate 5 is an positive electrode lead 5a which is connected to a sealing plate 2. In the same manner, a negative electrode lead 6a comes out from a negative electrode plate 6, and is connected to the bottom of the battery casing 1. Insulating gasket 3 is situated about sealing plate 2.

Electronically conductive metals and alloys having organic electrolyte resistance can be used for the battery casing and lead plates. For example, such metals as iron, nickel, titanium, molybdenum copper and aluminum and their alloys can be used. For the battery casing, processed stainless steel plate or Al—Mn alloy plate is favorably used, and for the positive electrode lead and the negative electrode lead, aluminum and nickel respectively are most favorable. For the battery casing, engineering plastics can be used independently or in combination with metals in order to reduce weight.

Insulating rings 8 are disposed on the top and bottom of an electrode plate group 4. A safety valve can be used as a sealing plate. Apart from the safety valve, other conventionally used safety elements can be disposed. As an overcurrent protector, for example, fuses, bimetal and PTC elements can be used. To deal with increases in internal pressure of the battery casing, a cut can be provided to the battery casing, a gasket cracking method or a sealing plate cracking method can be applied, or the connection to the lead plate can be severed. As other methods, a protective circuit incorporating anti-overcharging and anti-overdischarging systems, can be included in or connected independently to a charger. As an anti-overcharging method, current flow can be cut off by an increase in internal pressure of the battery. In this case, a compound which raises internal pressure can be mixed with the electrode mixture or with the electrolytes. Such compounds include carbonates such as $Li_2CO_3$, $LiHCO_3$, $Na_2CO_3$, $NaHCO_3$ and $MgCO_3$.

The cap, the battery casing, the sheet and the lead plate can be welded by conventional methods such as an alternative current or a direct current electric welding, a laser welding and an ultrasonic welding. As a sealing material, conventional compounds and composites such as asphalt can be used.

The battery of the present invention can be applied in any form including coin shapes, button shapes, sheet shapes, laminated shapes, cylinder shapes, flat types, square types and large types used in electric cars.

The battery of the present invention can be used for portable information terminals, portable electronic devices, domestic portable electricity storing devices, motor cycles, electric cars and hybrid electric cars. However, the application of the battery is not limited to the foregoing.

The present invention is described in detail hereinafter in accordance with the preferred embodiments. The descriptions are not intended to be construed as limitations upon the scope of the invention.

Manufacture of the Composite Particles

In Table 1, components (pure elements, inter-metallic compounds, solid solution) of the solid phase A and the solid phase B of the composite particles used in the preferred embodiments of the present invention, composition ratio of elements, melting temperature, and solid phase line temperature are shown. Commercially available highly pure reagents are used as ingredients of each element. Impurities contained in the ingredients are examined with an inductively coupled plasma atomic emission spectroscopy, and results are described in table 2.

To obtain solid materials, powder or a block of each element composing composite particles is put into a fusion vessel in the composition ratio shown in table 1, fused at the melting temperature also shown in table 1. The fused mixture is rapidly cooled and solidified using a rapid cooling roll. Then, the solid was heat treated at temperatures of 10° C.~50° C. lower than the solid phase line temperatures shown in table 1, in an inert atmosphere for 20 hours. The heat treated material is ground with a ball mill, and classified by using a sieve to prepare composite particles having a diameter not larger than 45 $\mu$m. Observation with an electron microscope confirmed these composite particles having part of or the whole surface of the solid phase A thereof covered with the solid phase B.

Negative Electrode Plate

To prepare the negative electrode plate 6, 20 wt % of carbon powder and 5 wt % of polyvinylidene fluoride are mixed with a 75 wt % of the composite particles synthesized under the foregoing conditions. The mixture is dispersed in dehydrated N-methylpyrrolidinone to form a slurry. The slurry is coated on a negative electrode current collector comprising copper foil, dried and rolled under pressure to form the negative electrode plate 6.

Positive Electrode Plate

To prepare the positive electrode plate 5, 10 wt % of carbon powder and 5 wt % of polyvinylidene fluoride are mixed with 85 wt % of lithium cobaltate powder. The mixture is dispersed in dehydrated N-methylpyrrolidinone to form a slurry. The slurry is coated on an positive electrode current collector comprising copper foil, and dried and rolled under pressure to form the negative electrode plate 5.

Electrolyte

The electrolyte is prepared by dissolving 1.5 mol/l of $LiPF_6$ in a mixed solvent of EC and EMC mixed at the ratio of 1 to 1 by volume.

The First Preferred Embodiment

In the first preferred embodiment, the piercing strength of the separators disposed in between the positive electrode and the negative electrode is set at around 300 g, and their thickness is set (1) 10 $\mu$m, (2) 13 $\mu$m, (3) 15 $\mu$m, (4) 20 $\mu$m, (5) 30 $\mu$m, (6) 40 $\mu$m and (7) 45 $\mu$m. Polyethylene porous film is used to prepare the separators.

Using the materials shown in table 1, batteries with separators with different thickness are manufactured. The manufactured cylindrical batteries are 18 mm in diameter and 65 mm in height. The batteries are charged with constant current of 100 mA until their voltage becomes 4.1 V, and then discharged at the constant current of 100 mA until their voltage becomes 2.0 V. The charge/discharge cycle is repeated in a temperature-controlled oven at 20° C. The charge/discharge cycle is repeated 100 times, and ratio of the discharge capacity at the 100th cycle to that of the first cycle is shown in Table 3 as capacity retention rates.

For comparison, a cylindrical battery is prepared by using graphite materials as the negative electrode material. In this case, 1510 mAh discharge capacity at the first cycle and 92% capacity retention rate at the 100th cycle are obtained.

As it is clearly shown in Table 3, when the piercing strength of the separators is approximately 300 g, batteries 3–6 in which thickness of the separators is 15 $\mu$m or more and 40 $\mu$m or less, have a superior charge/discharge cycle properties with a higher capacity. Conversely, when the thickness of the separators is 15 $\mu$m or less, the capacity retention rate becomes 60% or less and sufficient properties can not be achieved.

The predominant reason for this decrease in the discharge capacity is considerably that, when the thickness of the separators is 15 $\mu$m or less, the negative electrode materials or conductive materials around the surface of the negative electrode plate partially penetrate through the separators disposed in between the positive electrode and the negative electrode due to the increase in volume of the negative electrode materials during charging, and cause a micro short circuit.

Although cycle deterioration caused by the micro short circuit does not occur, when the thickness of the separator is 45 $\mu$m or more, the volume of the separators within the casing of the battery increases. Thus, the amount of the materials in the positive electrode and the negative electrode decreases, resulting in a lowered discharge capacity at the first cycle to the level almost the same as a battery using graphite materials as the negative electrode. Therefore, it is difficult to achieve a battery with a high capacity.

The Second Preferred Embodiment

In the second preferred embodiment, the thickness of the separators disposed in between the positive electrode and the negative electrode is set at 15 $\mu$m, and the piercing strength thereof, set at 152 g, 204 g, 303 g, and 411 g. Polyethylene porous film is used to prepare the separators.

Batteries with different piercing strength are manufactured in the same manner as in the first preferred embodiment. The results are shown in Table 4. As it is clearly shown in Table 4, when the piercing strength of the separators is 200 g or stronger, the charge/discharge cycle property is superior with the capacity retention rate of the battery 85% or higher. Conversely, when the piercing strength of the separators is 200 g or less, the capacity retention rate of the battery is around 40%, thus failing to achieve desired properties.

The predominant reason for this deterioration in the capacity is that, when the piercing strength of the separators is 15 $\mu$m or less, the negative electrode materials or conductive materials around the surface of the negative electrode plate partially penetrate through the separators disposed in between the positive electrode and the negative electrode due to the increase in volume of the negative electrode materials during charging, and cause a micro short circuit.

In this embodiment, the batteries are formed with separators of different piercing strength by limiting the thickness of the separators to 15 $\mu$m, namely the thinner end of the range of 15 $\mu$m or more and 40 $\mu$m or less as defined in the present invention. However, from the results of the first and the second preferred embodiments, it can reasonably be expected that a micro short circuit should not occur when the thickness of the separators is within the range defined by the present invention and the piercing strength is 200 g or more.

In this embodiment, the negative electrode materials are limited to material A, however, other materials obtain similar results.

In the first and the second preferred embodiments, polyethylene porous film is used to prepare the separators, however, olefin polymers such as polypropylene and polyethylene may be used independently or in combination to obtain similar results.

Regarding constituent elements of the negative electrode materials, when the solid phase A is Sn, Mg from group 2 elements, Fe and Mo from transition elements, Zn and Cd from group 12 elements, Al from group 13 elements and Sn from group 14 elements are used as constituent elements of the solid phase B. However, similar results are obtained with other elements selected from each group.

When the solid phase A is Si, Mg from the group 2 elements, Co and Ni from the transition elements, Zn from the group 12 elements, Al from the group 13 elements and Sn from the group 14 elements are used. However, similar results are obtained with other elements selected from each group. Similarly, when the solid phase A is Zn, Mg from group 2 elements, Cu and V from transition elements, Cd from group 12 elements, Al from group 13 elements and Ge from group 14 elements are used. However, similar results are obtained with other elements selected from each group.

The composition ratio of the constituent elements of the negative electrode materials is not defined on the condition that the composite particles have two phases with one of them (phase A) mainly formed with Sn, Si, and Zn, and part of or the whole surface of which is covered with the other phase (phase B). The phase B is not necessarily composed only of solid solutions and inter-metallic compounds shown in Table 1. It may also contain a trace of elements composing each solid solution and inter-metallic compound, as well as other elements.

The Third Preferred Embodiment

In the third preferred embodiment, the amount of the electrolyte is set at 0.05 ml/g, 0.10 ml/g, 0.15 ml/g, 0.20 ml/g, 0.25 ml/g, 0.40ml/g and 0.45 ml/g against the total weight of lithium-cobalt composite oxide contained in the casing of the battery and the negative electrode materials.

With the foregoing construction, batteries with different amounts of electrolyte are prepared in the same manner as the first preferred embodiment. These cylindrical batteries are 18 mm in diameter and 65 mm in height. The batteries are charged with constant current of 100 mA until their voltage becomes 4.1 V, and then discharged at the constant current of 100 mA until their voltage becomes 2.0 V. This cycle is repeated in a temperature-controlled oven at 20° C. The charge/discharge cycle is repeated 100 times, and ratio of the discharge capacity at the 100th cycle to that of the first cycle is shown in Table 5 as capacity retention rates. During charging/discharging cycles, liquid leakage was also observed.

As it is clearly shown in Table 5, the batteries of which the amount of the electrolyte is 0.1 ml/g or more and 0.4 ml/g or less have superior charge/discharge cycle properties with a higher capacity than the batteries using graphite, and have 85% or higher capacity retention rates. On the contrary, when the amount of electrolyte is 0.1 ml/g or less or 0.4 ml/g or higher, desirable properties can not be obtained, as the capacity retention rate fail to reach 85%.

The predominant reason for this decrease in the capacity is that, in the case of the batteries of which the amount of the electrolyte is 0.05 ml/g, the electrolyte fails to cover part of the negative electrode. In the part of the negative electrode where the electrolytic solution sufficiently penetrates, excess lithium ions contribute to the electrode reaction and enhance the charging capacity of the negative electrode materials, thus making the negative electrode materials an undesirable structure in terms of charge/discharge cycle properties. On the other hand, not less than half of the batteries of which the amount of the electrolyte is 0.45 ml/g, have electrolyte leakage during the charge/discharge cycles. This is predominantly due to the excess electrolyte which overflows from in between the positive electrode and the negative electrode plates, raising the internal pressure of the batteries.

The Fourth Preferred Embodiment

In this embodiment, batteries are prepared in the same manner as the first preferred embodiment using the materials shown in Table 1 for the negative electrode, and setting the porosity of the mixture layer of the negative electrode at 5%, 10%, 20%, 30%, 40%, 50%, and 60%. The porosity is adjusted by controlling the level of the rolling by a pressure roll. The thickness of the electrodes is set to be the same. The porosity is measured before constructing the batteries. These cylindrical batteries are 18 mm in diameter and 65 mm in height.

The batteries are charged with constant current of 100 mA until their voltage becomes 4.1 V, and then discharged at the constant current of 100 mA until their voltage becomes 2.0 V. This cycle is repeated in a temperature-controlled chamber at 20° C. The charge/discharge cycle is repeated 100 times, and ratio of the discharge capacity at the 100th cycle to that of the first cycle is shown in Table 6 as the capacity retention rates.

As it is clearly shown in Table 6, the batteries in which the porosity of the mixture layer is 10% or more, have a superior charge/discharge cycle properties with a higher retention rate of 85%. The batteries in which the porosity of the mixture layer is 50% or less, the discharge capacity after 100 cycles is 1500 mAh or more. This value matches the discharge capacity of a battery of the same size as this embodiment, in which carbon materials are used for the negative electrode and the porosity is set at 35%. Therefore, setting the porosity at 10% or more and 50% or less achieves batteries with higher capacity and superior charge/discharge cycle properties than batteries using carbon materials as the negative electrode materials.

The Fifth Preferred Embodiment

In this embodiment, batteries are prepared in the same manner as the battery No. 3 in the first preferred embodiment (thickness of the separator: 20 μm), in which a trace of predetermined amount of impurity elements are mixed with the negative electrode materials to form the composite particles. The added elements, and their amount, the discharge capacity at the first cycle, the discharge capacity at the 100th cycle, and the discharge capacity retention rate are shown in Table 7. In Table 7, the content of the elements is the total amount of impurity elements naturally included in the negative electrode materials and added elements. As Table 7 shows, by adding elements such as iron, lead and bismuth to the composite particles by 0.0005 wt % to 0.0020 wt %, the discharge capacity retention rate increases by 1–4%.

The Sixth Preferred Embodiment

In this embodiment, batteries are prepared in the same manner as the battery No. 3 in the first preferred embodiment (thickness of the separators: 20 μm). In the negative electrode, a mixture of the composite particles and fluorinated carbon compounds defined as $(C_xF)$ n ($1 \leq n < 20$) is used. The amount of the added carbon compounds is set at 4% of the addition of the composite particles and the carbon compounds. For comparison, conventional batteries in which the same carbon compounds are added to the graphite materials thereof are examined. The result is shown in Table 8. Comparing Table 8 and Table 3, the batteries of this embodiment have a significantly higher discharge retention rate than those to which no carbon compounds are added. Compared with the batteries using graphite, the batteries of this embodiment have a remarkably higher discharge capacity at the first cycle.

Figure 3:
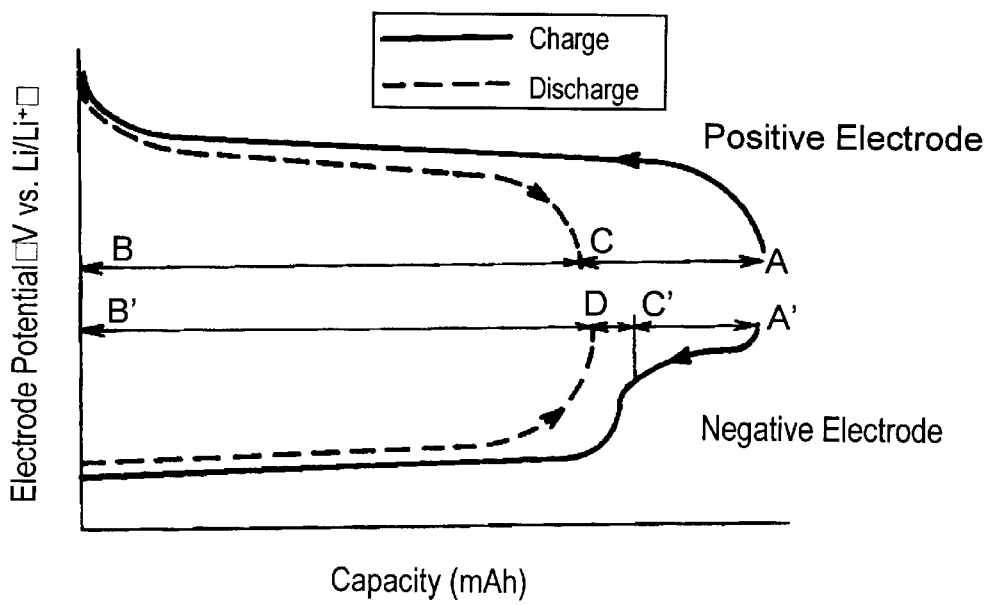
FIG. 3 shows a schematic view of charge and discharge at the first cycle in accordance with a sixth preferred embodiment of a lithium secondary battery of the present invention.

FIG. 3 is a schematic view showing a behavior of electric potentials of both positive electrode and negative electrode of the batteries of this embodiment at the first charging and the first discharging. In FIG. 3, (A–B) is the amount of initial charging of the positive electrode, (B–C) is the initial discharge capacity of the positive electrode, and (C–A) is the irreversible capacity of the positive electrode. (A'–B') is the initial charging amount of the negative electrode, which is equal to the amount of (A–B) of the positive electrode. In the process of the initial charging of the negative electrode, fluorinated carbon compounds added to the negative electrode are electrochemically reduced, and after the amount (A'–C') is charged, the negative electrode active materials which are the main components of the negative electrode are charged with lithium ions. It is equal to the initial charge amount in the negative electrode active materials (B'–C'). The discharge capacity of the negative electrode is (B'–D) which is equal to that of the positive electrode (B–C). The discharge capacities of the positive electrode and the negative electrode are reversible capacities of each electrode. (C'–D) is an irreversible capacity of the negative electrode active materials themselves.

As understood from FIG. 3, for the amount of the fluorinated carbon compounds, the value of (A'–C'), obtained by subtracting the irreversible capacity of the composite particles which are main materials of the negative electrode from the reversible capacity of the positive electrode (C–A), is applied. The fluorinated carbon compounds have large electrochemical equivalents per weight, therefore, the amount needed to be added is very small, and even after being added to the negative electrode, the increase in volume is insignificant.

As described so far, by adding fluorinated carbon compounds during charging especially during the first charging, to the negative electrode, reversible capacity of the positive electrode and the negative electrode is utilized to the maximum extent, thereby achieving a high capacity. At the same time, excessive charging of the negative electrode occurring during the charging and discharging from the second cycle onwards, is effectively restricted, thereby preventing the deterioration of the cycle life.

The Seventh Preferred Embodiment

In this embodiment, batteries are formed in the same manner as the sixth preferred embodiment.

The positive electrode plate is manufactured in the steps described below.

Nickel sulfate solution, cobalt sulfate solution, and sodium hydrate solution are used. The nickel sulfate solution and the cobalt sulfate solution are lead into a vessel at a constant flow rate, stirred thoroughly, and then the sodium hydrate solution is added. Formed precipitate is washed with water and dried to obtain co-precipitated nickel-cobalt hydroxides. The composition formula of the co-precipitated nickel-cobalt hydroxides is $Ni_{0.85}Co_{0.15}(OH)_2$. The co-precipitated nickel-cobalt hydroxides and lithium hydroxides are mixed, and in an oxidizing atmosphere, are heated for 10 hours at 800° C. to form $LiNi_{0.85}Co_{0.15}O_2$.

To prepare the positive electrode plate 5, 10 wt % carbon powder and 5 wt % polyvinylidene fluoride are mixed with 85 wt % $LiNi_{0.85}Co_{0.15}O_2$. The mixture is dispersed in dehydrated N-methyl pyrrolidinone to form a slurry. The slurry is coated on a negative electrode current collector comprising aluminum foil, dried and rolled under pressure to form the negative electrode plate 6.

NiO is mixed into the negative electrode. The amount of the foregoing metallic compounds added is 3.36 wt % against the total amount of the composite particles and the foregoing metallic compounds. For comparison, a battery prepared by adding 3.10 wt % of NiO to graphite conventionally used in batteries is examined. The result is shown in Table 9. Comparing Table 9 and Table 3, the batteries of this embodiment have a significantly higher discharge retention rate than the ones without NiO, resulting in increase in the cycle characteristics. Compared with the batteries using graphite, the batteries of this embodiment have a remarkably higher discharge capacity at the first cycle.

The reason why the cycle properties improve in this embodiment is the same as that of the sixth preferred embodiment.

The Eighth Preferred Embodiment

In this embodiment, batteries are formed in the same manner as the seventh preferred embodiment. Materials C and J in Table 1 are used for the composite particles of the negative electrode materials. Besides the composite particles, metallic oxides, metallic sulfides, metallic selenides, and metallic tellurides are also used for the negative electrode. The amount of the foregoing metallic compounds to be added is shown in Table 10 in weight percentage against the total amount of the composite particles and the metallic compounds. The result is shown in Table 10. Comparing Table 10 and Table 3, the batteries of this embodiment have a significantly higher discharge retention rate and better cycle properties than those to which none of the metallic compounds mentioned above is added.

As is the case with NiO added in the seventh preferred embodiment, other metallic oxides, metallic sulfides, metallic selenides, and metallic tellurides achieve similar results.

In this embodiment, $LiNi_{0.85}Co_{0.15}O_2$ is used as an positive electrode active material, however, other lithium containing metallic compounds, whose charge/discharge efficiency to intercalate and de-intercalate lithium ions defined as (intercalating amount/de-intercalating amount×100 (%)) is within the range of 75%~95%, can achieve similar results since working principle of the batteries is the same. Especially when the positive electrode active materials are lithium containing nickel oxides defined as $Li_xMi_{1-y}M_yO_z$ (M is at least one of Na, Mg, Sc, Y, Mn, Fe, Co, Ni, Cu, Zn, Al, Cr, Pb, Sb and B, and x=0–1.2, Y=0–0.9, z=2.0–2.3), the irreversible capacity is large, thus the effect of the present invention is especially high. Even higher effect can be achieved when the above lithium containing nickel oxides are synthesized at a temperature range of 750° C.–900° C.

The Ninth Preferred Embodiment

In this embodiment, batteries are prepared in the same manner as the first preferred embodiment, and with different ratios of the positive electrode specific surface area to that of the negative electrode. Material B in Table 1 is used as a negative electrode material. The specific surface area of the material B changes under various manufacturing conditions besides the diameter of the particles, such as rotating velocity of the roll during roll-quenching, conditions of the heat treatment conducted in an inert atmosphere, and conditions of the grinding by the ball mill. Powder materials having various specific surface areas as a result of these different manufacturing conditions are used as samples.

Figure 4:
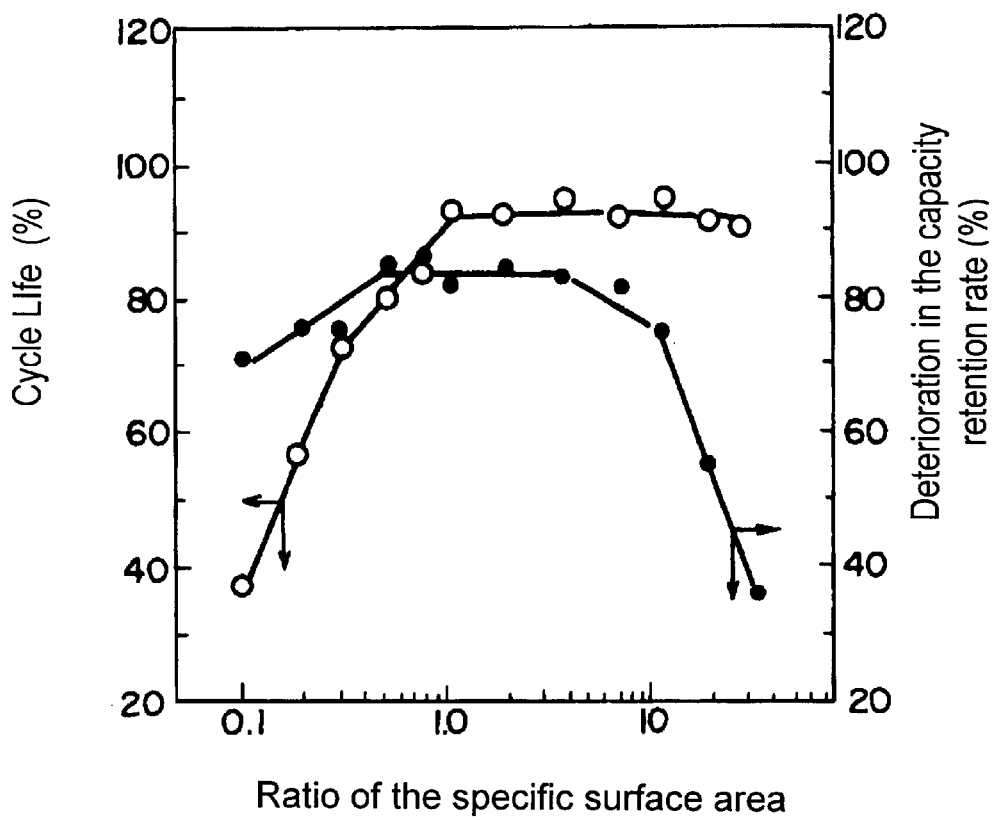
FIG. 4 shows a graph illustrating changes in cycle life and deterioration in the capacity retention rate against the ratio of a specific surface area of positive electrode materials to a specific surface area of negative electrode materials.

It has been known that the specific surface area of the lithium cobaltate used as the positive electrode materials can be changed depending on different manufacturing methods. The cylindrical batteries prepared in this embodiment are 18 mm in diameter and 65 mm in height. FIG. 4 shows changes in the cycle life and the deterioration in the capacity retention rate at high temperatures.

The horizontal axis of FIG. 4 shows values of (the specific surface area of the negative electrode materials)/(the specific surface area of the positive electrode materials) (hereinafter, ratio of the specific surface area) as a logarithm axis. The vertical line on the right side shows the cycle life, and on the left side, deterioration in the capacity retention rate. During the test on the cycle life, batteries are charged with constant voltage of 4.1V and constant current 1A in maximum current limit, until the current becomes 100 mA. The discharge is conducted by the constant current of 500 mA until the voltage reaches 2.0V. Quiescent period during switching between charging and discharging is set to be 20 minutes. For the cycle life, the number of cycles repeated until the capacity decreases to 80% of the first discharge capacity are measured. The vertical line of FIG. 4 shows values of cycle life obtained when the cycle life of a battery, which is prepared for comparison in the same manner using graphite as a negative electrode material, is set at 100. The ratio of the specific surface area of the battery using graphite prepared for comparison is 8. The charging/discharging cycles are repeated in a temperature-controlled oven at 20° C. The test on deterioration in the capacity retention rate is conducted on a charged battery which is kept in the temperature-controlled oven at 60° C. for 20 days by measuring its capacity retention rate against its initial capacity. In this case as well, the ratio is shown when the deterioration rate in the capacity of the battery using graphite as a negative electrode material is 100. Looking at the cycle life, as FIG. 4 shows, when the ratio of the specific surface area is 1.0 or less, it starts to decrease gradually and at 0.3 or less, it decreases rapidly. Therefore, the ratio is favorably 0.3 or more, and especially 1.0 or more. When the ratio of the specific surface area is 0.3 or less, the influence of a smaller reaction area of the negative electrode compared with that of positive electrode becomes clear with lithium depositing on the surface of the negative electrode material during a high-speed charging, thereby significantly reducing the cycle life of the batteries.

Regarding the capacity retention rate, when the ratio of the specific surface area is 4 or more, it lowers gradually and at 12 or more, it lowers rapidly. Therefore, the ratio of the specific surface area is favorably 12 or less, especially 4 or less. When it is 4 or more, the utilization rate of the positive electrode materials increases. As a result, the electric potential of the positive electrode when fully charged, rises promoting the generation of gas. Thus, when the battery is charged and left as it is, significant deterioration in the capacity results. Due to the foregoing reasons, the ratio of the specific area is favorably between 0.3 and 12, especially between 1 and 4.

In the same manner, batteries are prepared using negative electrode materials other than the material B in Table 1, and the cycle life and the deterioration in the capacity retention rate at high temperatures are measured. The result is shown in Table 11. With these materials, almost the same results are obtained. In the sections of cycle life and the deterioration in the capacity retention rate of Table 11, favorable ranges of the ratios of the specific surface area are shown. Regarding the cycle life, favorable ranges are not less than the values in parenthesis. Conversely, favorable ranges for the capacity retention rate are not more than the values in the parentheses.

In this embodiment, the batteries are charged with constant voltage of 4.1V and constant current 1A in maximum current limit, however, similar results are achieved with different charging voltage and current levels and with pulse charging. Considering this result, the favorable ratio of the specific surface area is between 0.3 and 12, and particularly between 1 and 4, regardless of charging/discharging conditions. This preferred embodiment confirms that the batteries of the present invention are suitable for a high-speed charging.

The Tenth Preferred Embodiment

In this embodiment, batteries are prepared in the same manner as the ninth preferred embodiment. To measure impedance, a cylindrical battery in which a positive electrode or a negative electrode plate is used as an active electrode and lithium metal is used as the opposite electrode. In this case, a cylindrical battery like the one shown in FIG. 1 is prepared in such a manner that electrode plates and metallic lithium foil are rolled up via separators to form a cylindrical structure. The battery is 17 mm in diameter and 50 mm in height.

Figure 5:
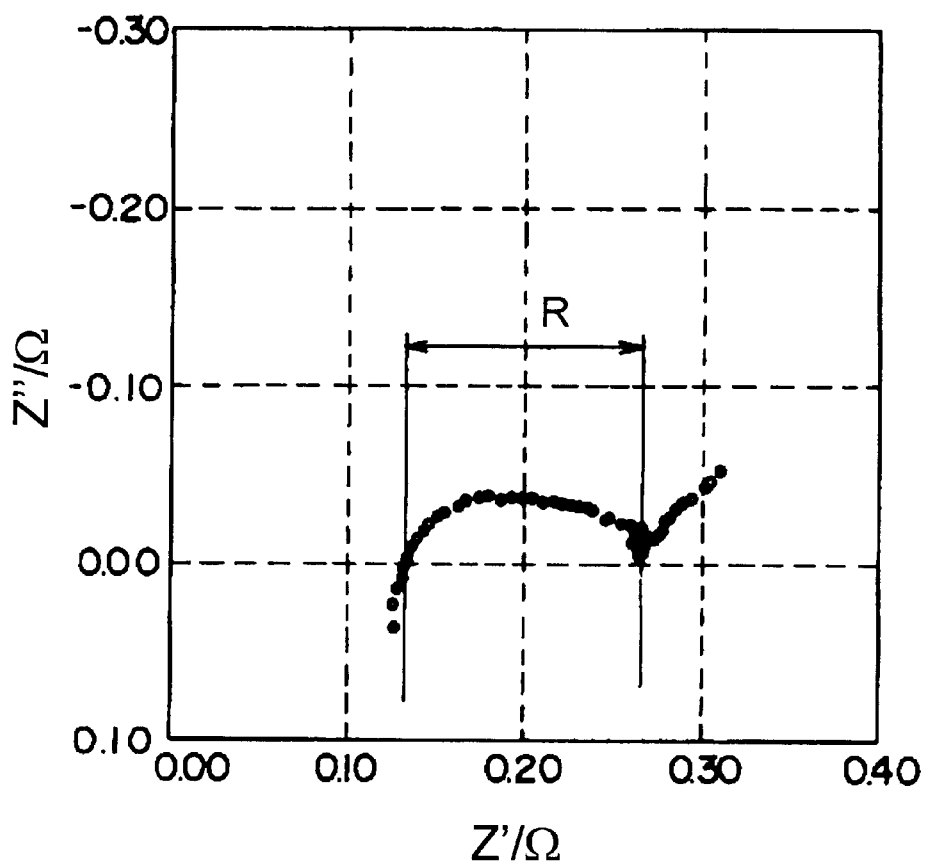
FIG. 5 shows a view of a complex plane of impedance measurement.

Impedance is measured at a frequency range of 10 kHz and 10 MHz. FIG. 5 shows one of the measured values plotted on a complex plane. This is the result of a cylindrical battery in which graphite is used as a negative electrode material and lithium metal as an opposite electrode. In the case of this measuring, the battery is charged in advance so that lithium ions of 155 mAH/g are intercalated into the graphite.

As FIG. 5 shows, the diameter of the arc is defined as R; with R1 being a diameter of an arc plotted when the positive electrode plate is set as an active electrode, and R2, the negative electrode plate. Impedance is measured after charging the batteries such that both electrode plates are charged 50%, assuming their conditions when they are incorporated into a battery.

Figure 6:
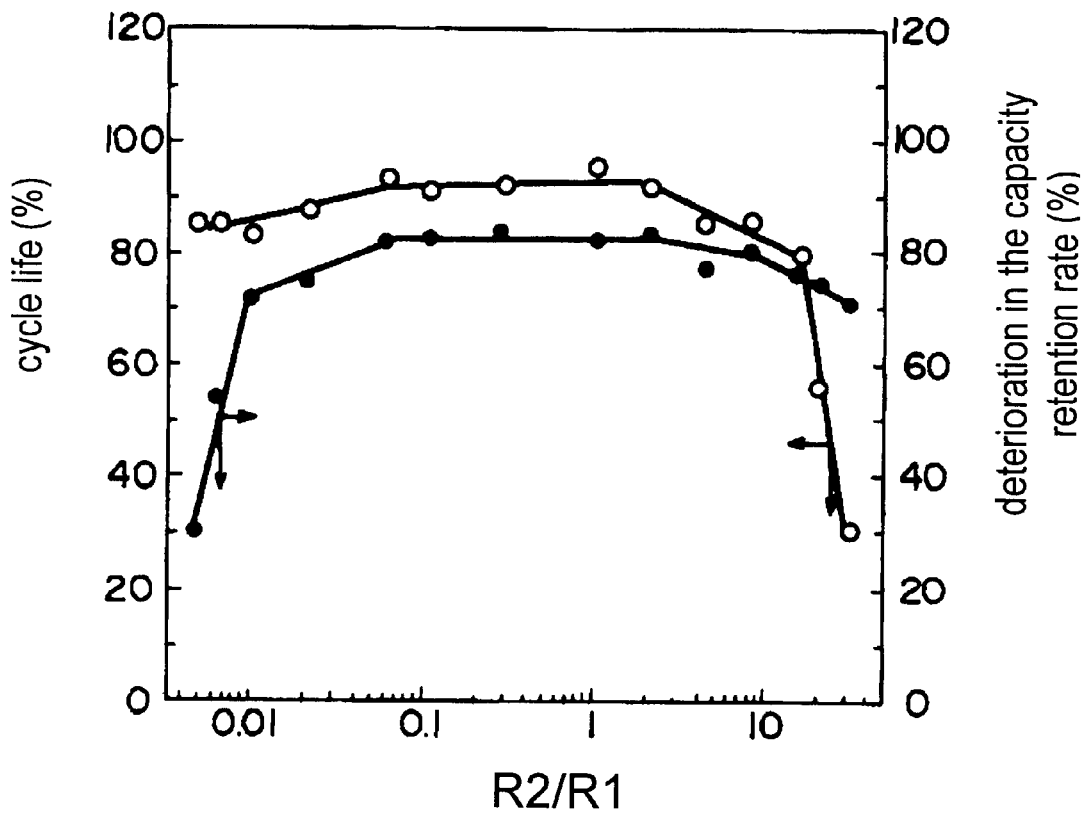
FIG. 6 shows changes in cycle life and deterioration in the capacity retention rate against the ratio of the specific surface area of the positive electrode materials to the specific surface area of the negative electrode materials.

FIG. 6 shows changes in the cycle life and the deterioration in the capacity retention rate at high temperatures of cylindrical batteries using a variety of different positive electrodes and negative electrodes. The horizontal axis of FIG. 6 shows values of the logarithm of R2/R1. The vertical axis on the right side shows cycle life, and on the left deterioration in the capacity retention rate. During the test on the cycle life, batteries are charged with constant voltage of 4.1V and constant current 1A in maximum current limit, until the current becomes 100 mA. The discharge is conducted at a constant current of 500 mA until the voltage reaches 2.0V. The quiescent period during switching between charging and discharging is set at 20 minutes. Regarding the cycle life, the number of cycles repeated until the capacity decreases to 80% of the first discharge capacity are measured. The vertical line of FIG. 6 shows the ratio of cycle life against the cycle life, being set at 100, of a battery prepared for comparison in the same manner using graphite as a negative electrode material. The value of R2/R1 of the battery which is prepared for comparison using graphite as a negative electrode material is 0.5. The charging/discharging cycles are repeated in a temperature-controlled oven at 20° C. The test on deterioration in the capacity retention rate is conducted on a charged battery which is kept in the temperature-controlled oven at 60° C. for 20 days by measuring its capacity retention rate against its initial capacity. In this case as well, the ratio is shown when the deterioration rate in the capacity of the battery using graphite as a negative electrode material is 100.

Regarding the cycle life, as FIG. 6 shows, when the value of R2/R1 is 2 or more, it starts to decrease gradually and at 15 or more, it decreases rapidly. Therefore, the value is favorably 15 or less, particularly 2 or less. Regarding the capacity retention rate, when the value of R2/R1 is 0.5 or less, it lowers gradually and at 0.01 or less, it lowers rapidly. Therefore, the value of R2/R1 is favorably 0.01 or larger, and particularly 0.05 or larger. Due to the foregoing reasons, the value of R2/R1 is favorably between 0.01 and 15, especially between 0.05 and 2.

In the same manner, batteries are prepared using negative electrode materials other than the material B in Table 1, and the cycle life and the deterioration in the capacity retention rate at high temperatures are measured. The result is shown in Table 10. With these materials, almost the same results as those of the material B are obtained. In the sections concerning cycle life and the deterioration in the capacity retention rate in Table 10, favorable ranges of R2/R1 are shown. Values in parentheses indicate more favorable ranges. Regarding the cycle life, favorable ranges are not more than the values in the parenthesis. Conversely, favorable ranges for the capacity retention rate are not less than the values in the parentheses.

In this embodiment, the batteries are charged with constant voltage of 4.1V and constant current 1A in maximum current limit, however, similar result are achieved with different charging voltage and current levels and with pulse charging. Considering this result, the favorable value of R2/R1 is between 0.01 and 15, and particularly between 0.05 and 2 regardless of charging/discharging conditions.

Industrial Applicability

As thus far described, according to the present invention, non-aqueous electrolyte secondary batteries which are capable of being charged at a high speed and have higher capacity and superior cycle properties to conventional batteries using carbon materials as negative electrode materials thereof can be achieved. The industrial effect of this is remarkable.

TABLE 1

| Negative electrode material | Phase A | Phase B | Melting temperature (° C.) | Solid line temperature (° C.) | Composition (Atom %) |
|---|---|---|---|---|---|
| Material A | Sn | $Mg_2Sn$ | 770 | 204 | Sn:Mg = 50:50 |
| Material B | Sn | $FeSn_2$ | 1540 | 513 | Sn:Fe = 70:30 |
| Material C | Sn | $MoSn_2$ | 1200 | 800 | Sn:Mo = 70:30 |
| Material D | Sn | Zn, Sn Solid S. | 420 | 199 | Sn:Zn = 90:10 |
| Material E | Sn | Cd, Sn Solid S. | 232 | 133 | Sn:Cd = 95:5 |
| Material F | Sn | In, Sn Solid S. | 235 | 224 | Sn:In = 98:2 |
| Material G | Sn | Sn, Pb Solid S. | 232 | 183 | Sn:Pb = 80:20 |
| Material H | Si | $Mg_2Si$ | 1415 | 946 | Si:Mg = 70:30 |
| Material I | Si | $CoSi_2$ | 1495 | 1259 | Si:Co = 85:15 |
| Material J | Si | $NiSi_2$ | 1415 | 993 | Si:Ni = 69:31 |
| Material K | Si | Si, Zn Solid S. | 1415 | 420 | Si:Zn = 50:50 |
| Material L | Si | Si, Al Solid S. | 1415 | 577 | Si:Al = 40:60 |
| Material M | Si | Si, Sn Solid S. | 1415 | 232 | Si:Sn = 50:50 |
| Material N | Zn | $Mg_2Zn_{11}$ | 650 | 364 | Zn:Mg = 92.9:7.8 |
| Material O | Zn | Zn, Cu Solid S. | 1085 | 425 | Zn:Cu = 97:3 |
| Material P | Zn | $VZn_{11}$ | 700 | 420 | Zn:V = 94:6 |
| Material Q | Zn | Zn, Cd Solid S. | 420 | 266 | Zn:Cd = 50:50 |
| Material R | Zn | Zn, Al Solid S. | 661 | 381 | Zn:Al = 90:10 |
| Material S | Zn | Zn, Ge Solid S. | 938 | 394 | Zn:Ge = 97:3 |

TABLE 2

| | Impurities (Weight ppm) | | | | | | | | | | | | | | | | | |
|---|---|---|---|---|---|---|---|---|---|---|---|---|---|---|---|---|---|---|
| Material | Ag | Al | Bi | Ca | Cd | Co | Cr | Cu | Fe | Mg | Mn | Mo | Na | Ni | Pb | Sb | Sn | Si | Zn |
| Al | | | | | | | | | 1 | 2 | | | | | | | | 2 | |
| Cd | | | | | | | 1 | | | | 1 | | | | 3 | | | | 2 |
| Co | | | | | | | | | 18 | 1 | | 12 | 5 | 125 | | | 23 | | |
| Cu | 1 | | 1 | 1 | | | | | 1 | 1 | | | 2 | | <1 | | | | 1 |
| Fe | | | | | | | | | | | <1 | | | | | | | | 4 |
| Ge | | | | | | 3 | | | 5 | <1 | | | | <1 | | | | | <1 |
| In | | | <1 | <1 | | <1 | | | 4 | 1 | | | 3 | | <1 | <1 | | | <1 |
| Mg | <1 | <1 | | | | | | <1 | 15 | | 35 | | | | <1 | | | <1 | 10 |
| Mo | | | | | | | | | 12 | 2 | | | | | <1 | | <1 | | |

TABLE 2-continued

| Material | Impurities (Weight ppm) | | | | | | | | | | | | | | | | | |
|---|---|---|---|---|---|---|---|---|---|---|---|---|---|---|---|---|---|---|
| | Ag | Al | Bi | Ca | Cd | Co | Cr | Cu | Fe | Mg | Mn | Mo | Na | Ni | Pb | Sb | Sn | Si | Zn |
| Ni | | | | | | 10 | | | 8 | | | | | | | | | | |
| Pb | <1 | | | <1 | | | | | 4 | | | | <1 | | <1 | | | <1 | <1 |
| Sn | 2 | | 10 | | 2 | | | 3 | 14 | 2 | | | | | 11 | <1 | | | 1 |
| V | 6 | 100 | | | | 80 | | | 100 | | 9 | 30 | | <1 | <1 | | | 500 | |
| Zn | | <1 | | | | | <1 | | | | | | | | | <1 | | | |

TABLE 3

| Battery No. | | Separator Thickness (micro meter) | Initial Discharge Capacity (mAh) | 100th Discharge Capacity (mAh) | capacity retention rate (%) |
|---|---|---|---|---|---|
| Material A | 1 | 10 | 2050 | 882 | 43 |
| | 2 | 13 | 1998 | 1039 | 52 |
| | 3 | 15 | 1963 | 1688 | 86 |
| | 4 | 20 | 1872 | 1684 | 90 |
| | 5 | 30 | 1396 | 1476 | 87 |
| | 6 | 40 | 1520 | 1307 | 86 |
| | 7 | 45 | 1422 | 1209 | 85 |
| B | 1 | 10 | 2045 | 838 | 41 |
| | 2 | 13 | 1990 | 955 | 48 |
| | 3 | 15 | 1952 | 1737 | 89 |
| | 4 | 20 | 1864 | 1678 | 90 |
| | 5 | 30 | 1688 | 1469 | 87 |
| | 6 | 40 | 1509 | 1283 | 85 |
| | 7 | 45 | 1420 | 1221 | 86 |
| C | 1 | 10 | 2029 | 811 | 40 |
| | 2 | 13 | 1973 | 987 | 50 |
| | 3 | 15 | 1937 | 1666 | 86 |
| | 4 | 20 | 1847 | 1625 | 88 |
| | 5 | 30 | 1665 | 1449 | 87 |
| | 6 | 40 | 1495 | 1270 | 85 |
| | 7 | 45 | 1397 | 1229 | 88 |
| D | 1 | 10 | 2030 | 791 | 39 |
| | 2 | 13 | 1973 | 1007 | 51 |
| | 3 | 15 | 1942 | 1728 | 89 |
| | 4 | 20 | 1852 | 1667 | 90 |
| | 5 | 30 | 1673 | 1489 | 89 |
| | 6 | 40 | 1495 | 1300 | 87 |
| | 7 | 45 | 1406 | 1209 | 86 |
| E | 1 | 10 | 2056 | 822 | 40 |
| | 2 | 13 | 2000 | 860 | 43 |
| | 3 | 15 | 1964 | 1748 | 89 |
| | 4 | 20 | 1875 | 1706 | 91 |
| | 5 | 30 | 1697 | 1476 | 87 |
| | 6 | 40 | 1517 | 1304 | 86 |
| | 7 | 45 | 1426 | 1254 | 88 |
| F | 1 | 10 | 2042 | 776 | 38 |
| | 2 | 13 | 1987 | 914 | 46 |
| | 3 | 15 | 1954 | 1700 | 87 |
| | 4 | 20 | 1861 | 1694 | 91 |
| | 5 | 30 | 1683 | 1498 | 89 |
| | 6 | 40 | 1503 | 1323 | 88 |
| | 7 | 45 | 1415 | 1274 | 90 |
| G | 1 | 10 | 2053 | 821 | 40 |
| | 2 | 13 | 1997 | 1018 | 51 |
| | 3 | 15 | 1962 | 1727 | 88 |
| | 4 | 20 | 1871 | 1684 | 90 |
| | 5 | 30 | 1695 | 1475 | 87 |
| | 6 | 40 | 1512 | 1300 | 86 |
| | 7 | 45 | 1421 | 1250 | 88 |
| H | 1 | 10 | 2130 | 767 | 36 |
| | 2 | 13 | 2080 | 957 | 46 |
| | 3 | 15 | 2045 | 1779 | 87 |
| | 4 | 20 | 1956 | 1760 | 90 |
| | 5 | 30 | 1776 | 1581 | 89 |
| | 6 | 40 | 1594 | 1387 | 87 |
| | 7 | 45 | 1504 | 1308 | 87 |
| I | 1 | 10 | 2111 | 802 | 38 |
| | 2 | 13 | 2067 | 1034 | 50 |
| | 3 | 15 | 2028 | 1744 | 86 |
| | 4 | 20 | 1940 | 1727 | 89 |

TABLE 3-continued

| Battery No. | | Separator Thickness (micro meter) | Initial Discharge Capacity (mAh) | 100th Discharge Capacity (mAh) | capacity retention rate (%) |
|---|---|---|---|---|---|
| | 5 | 30 | 1762 | 1533 | 87 |
| | 6 | 40 | 1579 | 1342 | 85 |
| | 7 | 45 | 1493 | 1314 | 88 |
| J | 1 | 10 | 2155 | 776 | 36 |
| | 2 | 13 | 2100 | 966 | 46 |
| | 3 | 15 | 2065 | 1838 | 89 |
| | 4 | 20 | 1974 | 1796 | 91 |
| | 5 | 30 | 1759 | 1583 | 90 |
| | 6 | 40 | 1616 | 1390 | 86 |
| | 7 | 45 | 1526 | 1358 | 89 |
| K | 1 | 10 | 2147 | 902 | 42 |
| | 2 | 13 | 2094 | 1047 | 50 |
| | 3 | 15 | 2058 | 1770 | 86 |
| | 4 | 20 | 1969 | 1772 | 90 |
| | 5 | 30 | 1788 | 1556 | 87 |
| | 6 | 40 | 1611 | 1385 | 86 |
| | 7 | 45 | 1518 | 1366 | 90 |
| L | 1 | 10 | 2169 | 781 | 36 |
| | 2 | 13 | 2113 | 866 | 41 |
| | 3 | 15 | 2076 | 1806 | 87 |
| | 4 | 20 | 1989 | 1750 | 88 |
| | 5 | 30 | 1805 | 1552 | 86 |
| | 6 | 40 | 1628 | 1384 | 85 |
| | 7 | 45 | 1530 | 1331 | 87 |
| M | 1 | 10 | 2160 | 778 | 36 |
| | 2 | 13 | 2105 | 989 | 47 |
| | 3 | 15 | 2069 | 1821 | 88 |
| | 4 | 20 | 1981 | 1783 | 90 |
| | 5 | 30 | 1802 | 1550 | 86 |
| | 6 | 40 | 1620 | 1377 | 85 |
| | 7 | 45 | 1532 | 1348 | 88 |
| N | 1 | 10 | 2117 | 910 | 43 |
| | 2 | 13 | 2065 | 1053 | 51 |
| | 3 | 15 | 2027 | 1804 | 89 |
| | 4 | 20 | 1939 | 1764 | 91 |
| | 5 | 30 | 1759 | 1530 | 87 |
| | 6 | 40 | 1579 | 1342 | 85 |
| | 7 | 45 | 1487 | 1322 | 89 |
| O | 1 | 10 | 2126 | 957 | 45 |
| | 2 | 13 | 2070 | 1014 | 49 |
| | 3 | 15 | 2034 | 1790 | 88 |
| | 4 | 20 | 1945 | 1751 | 90 |
| | 5 | 30 | 1765 | 1571 | 89 |
| | 6 | 40 | 1584 | 1362 | 86 |
| | 7 | 45 | 1498 | 1303 | 87 |
| P | 1 | 10 | 2085 | 730 | 35 |
| | 2 | 13 | 2026 | 790 | 39 |
| | 3 | 15 | 1993 | 1754 | 88 |
| | 4 | 20 | 1909 | 1692 | 89 |
| | 5 | 30 | 1720 | 1479 | 86 |
| | 6 | 40 | 1543 | 1312 | 85 |
| | 7 | 45 | 1453 | 1279 | 88 |
| Q | 1 | 10 | 2092 | 837 | 40 |
| | 2 | 13 | 2034 | 956 | 47 |
| | 3 | 15 | 2001 | 1721 | 86 |
| | 4 | 20 | 1910 | 1719 | 90 |
| | 5 | 30 | 1735 | 1509 | 87 |
| | 6 | 40 | 1552 | 1319 | 85 |
| | 7 | 45 | 1462 | 1287 | 88 |
| R | 1 | 10 | 2127 | 787 | 37 |
| | 2 | 13 | 2076 | 1038 | 50 |
| | 3 | 15 | 2039 | 1794 | 88 |
| | 4 | 20 | 1949 | 1754 | 90 |
| | 5 | 30 | 1769 | 1557 | 88 |
| | 6 | 40 | 1589 | 1351 | 85 |
| | 7 | 45 | 1501 | 1336 | 89 |
| S | 1 | 10 | 2087 | 897 | 43 |
| | 2 | 13 | 2034 | 997 | 49 |
| | 3 | 15 | 1995 | 1736 | 87 |
| | 4 | 20 | 1907 | 1697 | 89 |
| | 5 | 30 | 1725 | 1484 | 86 |
| | 6 | 40 | 1550 | 1318 | 85 |
| | 7 | 45 | 1459 | 1313 | 90 |

TABLE 4

| Battery No. | | Separator Piercing Strength (g) | Initial Discharge Capacity (mAh) | 100th Discharge Capacity (mAh) | capacity retention rate (%) |
|---|---|---|---|---|---|
| Material A | 1 | 152 | 1963 | 844 | 43 |
|  | 2 | 204 | 1963 | 1747 | 89 |
|  | 3 | 303 | 1963 | 1688 | 86 |
|  | 4 | 411 | 1963 | 1766 | 90 |
| H | 1 | 152 | 1956 | 841 | 43 |
|  | 2 | 204 | 1956 | 1741 | 89 |
|  | 3 | 303 | 1956 | 1682 | 86 |
|  | 4 | 411 | 1956 | 1760 | 90 |

TABLE 5

| Battery No. | | Electrolyte Amount (ml/g) | Initial Discharge Capacity (mAh) | 100th Discharge Capacity (mAh) | capacity retention rate (%) |
|---|---|---|---|---|---|
| Material A | 1 | 0.05 | 1872 | 1367 | 73 |
|  | 2 | 0.10 | 1872 | 1591 | 85 |
|  | 3 | 0.15 | 1872 | 1610 | 86 |
|  | 4 | 0.20 | 1872 | 1685 | 90 |
|  | 5 | 0.25 | 1872 | 1629 | 87 |
|  | 6 | 0.40 | 1872 | 1591 | 85 |
|  | 7 | 0.45 | 1872 | 1310 | 70 |
| B | 1 | 0.05 | 1864 | 1342 | 72 |
|  | 2 | 0.10 | 1864 | 1603 | 85 |
|  | 3 | 0.15 | 1864 | 1659 | 86 |
|  | 4 | 0.20 | 1864 | 1678 | 88 |
|  | 5 | 0.25 | 1864 | 1622 | 87 |
|  | 6 | 0.40 | 1864 | 1584 | 85 |
|  | 7 | 0.45 | 1864 | 1342 | 72 |
| C | 1 | 0.05 | 1847 | 1274 | 69 |
|  | 2 | 0.10 | 1847 | 1570 | 85 |
|  | 3 | 0.15 | 1847 | 1588 | 86 |
|  | 4 | 0.20 | 1847 | 1625 | 88 |
|  | 5 | 0.25 | 1847 | 1607 | 87 |
|  | 6 | 0.40 | 1847 | 1570 | 85 |
|  | 7 | 0.45 | 1847 | 1330 | 72 |
| D | 1 | 0.05 | 1852 | 1315 | 74 |
|  | 2 | 0.10 | 1852 | 1574 | 86 |
|  | 3 | 0.15 | 1852 | 1648 | 89 |
|  | 4 | 0.20 | 1852 | 1667 | 91 |
|  | 5 | 0.25 | 1852 | 1648 | 87 |
|  | 6 | 0.40 | 1852 | 1611 | 86 |
|  | 7 | 0.45 | 1852 | 1333 | 74 |
| E | 1 | 0.05 | 1875 | 1388 | 74 |
|  | 2 | 0.10 | 1875 | 1613 | 86 |
|  | 3 | 0.15 | 1875 | 1669 | 89 |
|  | 4 | 0.20 | 1875 | 1163 | 91 |
|  | 5 | 0.25 | 1875 | 1706 | 87 |
|  | 6 | 0.40 | 1875 | 1613 | 86 |
|  | 7 | 0.45 | 1875 | 1388 | 74 |
| F | 1 | 0.05 | 1861 | 1340 | 72 |
|  | 2 | 0.10 | 1861 | 1600 | 86 |
|  | 3 | 0.15 | 1861 | 1619 | 87 |
|  | 4 | 0.20 | 1861 | 1694 | 91 |
|  | 5 | 0.25 | 1861 | 1656 | 89 |
|  | 6 | 0.40 | 1861 | 1638 | 88 |
|  | 7 | 0.45 | 1861 | 1377 | 74 |
| G | 1 | 0.05 | 1871 | 1310 | 70 |
|  | 2 | 0.10 | 1871 | 1590 | 85 |
|  | 3 | 0.15 | 1871 | 1646 | 88 |
|  | 4 | 0.20 | 1871 | 1683 | 90 |
|  | 5 | 0.25 | 1871 | 1628 | 87 |
|  | 6 | 0.40 | 1871 | 1609 | 86 |
|  | 7 | 0.45 | 1871 | 1347 | 72 |
| H | 1 | 0.05 | 1956 | 1369 | 70 |
|  | 2 | 0.10 | 1956 | 1682 | 86 |
|  | 3 | 0.15 | 1956 | 1702 | 87 |
|  | 4 | 0.20 | 1956 | 1760 | 90 |
|  | 5 | 0.25 | 1956 | 1741 | 89 |
|  | 6 | 0.40 | 1956 | 1702 | 87 |
|  | 7 | 0.45 | 1956 | 1428 | 73 |
| I | 1 | 0.05 | 1940 | 1377 | 71 |
|  | 2 | 0.10 | 1940 | 1649 | 85 |
|  | 3 | 0.15 | 1940 | 1668 | 86 |
|  | 4 | 0.20 | 1940 | 1727 | 89 |
|  | 5 | 0.25 | 1940 | 1688 | 87 |
|  | 6 | 0.40 | 1940 | 1649 | 85 |
|  | 7 | 0.45 | 1940 | 1416 | 73 |
| J | 1 | 0.05 | 1974 | 1421 | 72 |
|  | 2 | 0.10 | 1974 | 1717 | 87 |
|  | 3 | 0.15 | 1974 | 1757 | 89 |
|  | 4 | 0.20 | 1974 | 1796 | 91 |
|  | 5 | 0.25 | 1974 | 1777 | 90 |
|  | 6 | 0.40 | 1974 | 1698 | 86 |
|  | 7 | 0.45 | 1974 | 1402 | 71 |
| K | 1 | 0.05 | 1969 | 1359 | 69 |
|  | 2 | 0.10 | 1969 | 1674 | 85 |
|  | 3 | 0.15 | 1969 | 1693 | 86 |
|  | 4 | 0.20 | 1969 | 1772 | 90 |
|  | 5 | 0.25 | 1969 | 1713 | 87 |
|  | 6 | 0.40 | 1969 | 1693 | 86 |
|  | 7 | 0.45 | 1969 | 1437 | 73 |
| L | 1 | 0.05 | 1989 | 1432 | 72 |
|  | 2 | 0.10 | 1989 | 1691 | 85 |
|  | 3 | 0.15 | 1989 | 1730 | 87 |
|  | 4 | 0.20 | 1989 | 1750 | 88 |
|  | 5 | 0.25 | 1989 | 1711 | 86 |
|  | 6 | 0.40 | 1989 | 1691 | 85 |
|  | 7 | 0.45 | 1989 | 1372 | 69 |
| M | 1 | 0.05 | 1981 | 1407 | 71 |
|  | 2 | 0.10 | 1981 | 1704 | 86 |
|  | 3 | 0.15 | 1981 | 1743 | 88 |
|  | 4 | 0.20 | 1981 | 1783 | 90 |
|  | 5 | 0.25 | 1981 | 1704 | 86 |
|  | 6 | 0.40 | 1981 | 1684 | 85 |
|  | 7 | 0.45 | 1981 | 1446 | 73 |
| N | 1 | 0.05 | 1939 | 1338 | 69 |
|  | 2 | 0.10 | 1939 | 1668 | 86 |
|  | 3 | 0.15 | 1939 | 1726 | 89 |
|  | 4 | 0.20 | 1939 | 1764 | 91 |
|  | 5 | 0.25 | 1939 | 1687 | 87 |
|  | 6 | 0.40 | 1939 | 1648 | 85 |
|  | 7 | 0.45 | 1939 | 1396 | 72 |
| O | 1 | 0.05 | 1945 | 1459 | 75 |
|  | 2 | 0.10 | 1945 | 1692 | 87 |
|  | 3 | 0.15 | 1945 | 1712 | 88 |
|  | 4 | 0.20 | 1945 | 1750 | 90 |
|  | 5 | 0.25 | 1945 | 1731 | 89 |
|  | 6 | 0.40 | 1945 | 1673 | 86 |
|  | 7 | 0.45 | 1945 | 1439 | 74 |
| P | 1 | 0.05 | 1901 | 1331 | 70 |
|  | 2 | 0.10 | 1901 | 1616 | 85 |
|  | 3 | 0.15 | 1901 | 1673 | 88 |
|  | 4 | 0.20 | 1901 | 1692 | 89 |
|  | 5 | 0.25 | 1901 | 1635 | 86 |
|  | 6 | 0.40 | 1901 | 1616 | 85 |
|  | 7 | 0.45 | 1901 | 1388 | 73 |
| Q | 1 | 0.05 | 1910 | 1375 | 72 |
|  | 2 | 0.10 | 1910 | 1624 | 85 |
|  | 3 | 0.15 | 1910 | 1643 | 86 |
|  | 4 | 0.20 | 1910 | 1719 | 90 |
|  | 5 | 0.25 | 1910 | 1662 | 87 |
|  | 6 | 0.40 | 1910 | 1624 | 85 |
|  | 7 | 0.45 | 1910 | 1337 | 70 |
| R | 1 | 0.05 | 1949 | 1364 | 70 |
|  | 2 | 0.10 | 1949 | 1676 | 86 |
|  | 3 | 0.15 | 1949 | 1715 | 88 |
|  | 4 | 0.20 | 1949 | 1754 | 90 |
|  | 5 | 0.25 | 1949 | 1715 | 88 |
|  | 6 | 0.40 | 1949 | 1657 | 85 |
|  | 7 | 0.45 | 1949 | 1442 | 74 |
| S | 1 | 0.05 | 1907 | 1354 | 71 |
|  | 2 | 0.10 | 1907 | 1621 | 85 |
|  | 3 | 0.15 | 1907 | 1659 | 87 |

TABLE 5-continued

| Battery No. | Electrolyte Amount (ml/g) | Initial Discharge Capacity (mAh) | 100th Discharge Capacity (mAh) | capacity retention rate (%) |
|---|---|---|---|---|
| 4 | 0.20 | 1907 | 1697 | 89 |
| 5 | 0.25 | 1907 | 1640 | 86 |
| 6 | 0.40 | 1907 | 1621 | 85 |
| 7 | 0.45 | 1907 | 1316 | 69 |

TABLE 6

| Battery No. | | Porosity (%) | Initial Discharge Capacity (mAh) | 100th Discharge Capacity (mAh) | capacity retention rate (%) |
|---|---|---|---|---|---|
| Material A | 1 | 5 | 2255 | 1488 | 66 |
| | 2 | 10 | 2192 | 1776 | 81 |
| | 3 | 20 | 2052 | 1765 | 86 |
| | 4 | 30 | 1922 | 1730 | 90 |
| | 5 | 40 | 1790 | 1647 | 92 |
| | 6 | 50 | 1656 | 1557 | 94 |
| | 7 | 60 | 1499 | 1439 | 96 |
| B | 1 | 5 | 2245 | 1414 | 63 |
| | 2 | 10 | 2178 | 1764 | 81 |
| | 3 | 20 | 2041 | 1776 | 87 |
| | 4 | 30 | 1914 | 1703 | 89 |
| | 5 | 40 | 1783 | 1623 | 91 |
| | 6 | 50 | 1651 | 1552 | 94 |
| | 7 | 60 | 1495 | 1420 | 95 |
| C | 1 | 5 | 2216 | 1374 | 62 |
| | 2 | 10 | 2159 | 1727 | 80 |
| | 3 | 20 | 2023 | 1720 | 85 |
| | 4 | 30 | 1897 | 1669 | 88 |
| | 5 | 40 | 1769 | 1610 | 91 |
| | 6 | 50 | 1637 | 1539 | 94 |
| | 7 | 60 | 1488 | 1414 | 95 |
| D | 1 | 5 | 2223 | 1423 | 64 |
| | 2 | 10 | 2163 | 1795 | 83 |
| | 3 | 20 | 2031 | 1787 | 88 |
| | 4 | 30 | 1902 | 1712 | 90 |
| | 5 | 40 | 1772 | 1648 | 93 |
| | 6 | 50 | 1640 | 1558 | 95 |
| | 7 | 60 | 1493 | 1418 | 95 |
| E | 1 | 5 | 2249 | 1372 | 61 |
| | 2 | 10 | 2190 | 1818 | 83 |
| | 3 | 20 | 2056 | 1789 | 87 |
| | 4 | 30 | 1925 | 1752 | 91 |
| | 5 | 40 | 1793 | 1650 | 92 |
| | 6 | 50 | 1660 | 1544 | 93 |
| | 7 | 60 | 1498 | 1423 | 95 |
| F | 1 | 5 | 2232 | 1384 | 62 |
| | 2 | 10 | 2174 | 1804 | 83 |
| | 3 | 20 | 2043 | 1777 | 87 |
| | 4 | 30 | 1911 | 1720 | 90 |
| | 5 | 40 | 1780 | 1655 | 93 |
| | 6 | 50 | 1644 | 1545 | 94 |
| | 7 | 60 | 1492 | 1417 | 95 |
| G | 1 | 5 | 2244 | 1369 | 61 |
| | 2 | 10 | 2185 | 1792 | 82 |
| | 3 | 20 | 2049 | 1803 | 88 |
| | 4 | 30 | 1921 | 1729 | 90 |
| | 5 | 40 | 1789 | 1664 | 93 |
| | 6 | 50 | 1657 | 1574 | 95 |
| | 7 | 60 | 1501 | 1426 | 95 |
| H | 1 | 5 | 2173 | 1304 | 60 |
| | 2 | 10 | 2111 | 1731 | 82 |
| | 3 | 20 | 1983 | 1725 | 87 |
| | 4 | 30 | 1856 | 1670 | 90 |
| | 5 | 40 | 1728 | 1607 | 93 |
| | 6 | 50 | 1602 | 1506 | 94 |
| | 7 | 60 | 1459 | 1386 | 95 |
| I | 1 | 5 | 2276 | 1411 | 62 |
| | 2 | 10 | 2207 | 1810 | 82 |
| | 3 | 20 | 2074 | 1784 | 86 |
| | 4 | 30 | 1940 | 1727 | 89 |
| | 5 | 40 | 1806 | 1680 | 93 |
| | 6 | 50 | 1672 | 1572 | 94 |
| | 7 | 60 | 1513 | 1452 | 96 |
| J | 1 | 5 | 2318 | 1484 | 64 |
| | 2 | 10 | 2249 | 1867 | 83 |
| | 3 | 20 | 2111 | 1858 | 88 |
| | 4 | 30 | 1974 | 1796 | 91 |
| | 5 | 40 | 1837 | 1708 | 93 |
| | 6 | 50 | 1701 | 1616 | 95 |
| | 7 | 60 | 1532 | 1455 | 95 |
| K | 1 | 5 | 2305 | 1475 | 64 |
| | 2 | 10 | 2241 | 1838 | 82 |
| | 3 | 20 | 2105 | 1831 | 87 |
| | 4 | 30 | 1969 | 1772 | 90 |
| | 5 | 40 | 1833 | 1686 | 92 |
| | 6 | 50 | 1698 | 1596 | 94 |
| | 7 | 60 | 1538 | 1461 | 95 |
| L | 1 | 5 | 2334 | 1424 | 61 |
| | 2 | 10 | 2263 | 1856 | 82 |
| | 3 | 20 | 2127 | 1850 | 87 |
| | 4 | 30 | 1989 | 1750 | 88 |
| | 5 | 40 | 1852 | 1685 | 91 |
| | 6 | 50 | 1715 | 1595 | 93 |
| | 7 | 60 | 1548 | 1471 | 95 |
| M | 1 | 5 | 2325 | 1418 | 61 |
| | 2 | 10 | 2254 | 1848 | 82 |
| | 3 | 20 | 2118 | 1843 | 87 |
| | 4 | 30 | 1981 | 1783 | 90 |
| | 5 | 40 | 1843 | 1696 | 92 |
| | 6 | 50 | 1707 | 1588 | 93 |
| | 7 | 60 | 1542 | 1465 | 95 |
| N | 1 | 5 | 2230 | 1472 | 66 |
| | 2 | 10 | 2151 | 1807 | 84 |
| | 3 | 20 | 2019 | 1797 | 89 |
| | 4 | 30 | 1889 | 1719 | 91 |
| | 5 | 40 | 1758 | 1635 | 93 |
| | 6 | 50 | 1625 | 1544 | 95 |
| | 7 | 60 | 1485 | 1426 | 96 |
| O | 1 | 5 | 2231 | 1406 | 63 |
| | 2 | 10 | 2163 | 1774 | 82 |
| | 3 | 20 | 2028 | 1764 | 87 |
| | 4 | 30 | 1895 | 1706 | 90 |
| | 5 | 40 | 1755 | 1615 | 92 |
| | 6 | 50 | 1618 | 1521 | 94 |
| | 7 | 60 | 1488 | 1414 | 95 |
| P | 1 | 5 | 2230 | 1405 | 63 |
| | 2 | 10 | 2168 | 1778 | 82 |
| | 3 | 20 | 2031 | 1747 | 86 |
| | 4 | 30 | 1901 | 1692 | 89 |
| | 5 | 40 | 1771 | 1612 | 91 |
| | 6 | 50 | 1634 | 1520 | 93 |
| | 7 | 60 | 1493 | 1418 | 95 |
| Q | 1 | 5 | 2238 | 1343 | 60 |
| | 2 | 10 | 2178 | 1742 | 80 |
| | 3 | 20 | 2043 | 1757 | 86 |
| | 4 | 30 | 1910 | 1719 | 90 |
| | 5 | 40 | 1779 | 1654 | 93 |
| | 6 | 50 | 1647 | 1565 | 95 |
| | 7 | 60 | 1498 | 1438 | 96 |
| R | 1 | 5 | 2237 | 1454 | 65 |
| | 2 | 10 | 2169 | 1800 | 83 |
| | 3 | 20 | 2036 | 1792 | 88 |
| | 4 | 30 | 1899 | 1709 | 90 |
| | 5 | 40 | 1765 | 1624 | 92 |
| | 6 | 50 | 1638 | 1540 | 94 |
| | 7 | 60 | 1486 | 1412 | 95 |
| S | 1 | 5 | 2228 | 1359 | 61 |
| | 2 | 10 | 2169 | 1800 | 83 |
| | 3 | 20 | 2038 | 1773 | 87 |
| | 4 | 30 | 1907 | 1697 | 89 |

TABLE 6-continued

| Battery No. | Porosity (%) | Initial Discharge Capacity (mAh) | 100th Discharge Capacity (mAh) | capacity retention rate (%) |
| --- | --- | --- | --- | --- |
| 5 | 40 | 1776 | 1616 | 91 |
| 6 | 50 | 1640 | 1542 | 94 |
| 7 | 60 | 1495 | 1420 | 95 |

TABLE 7

| Battery | | | Impurirty Element | | Initial Discharge Capacity (mAh) | 100th Discharge Capacity (mAh) | capacity retention rate (%) |
| --- | --- | --- | --- | --- | --- | --- | --- |
| | | | Original content (Weight %) | Final content (Weight %) | | | |
| Material A | 1 | Fe | 0 | 0.0015 | 1872 | 1685 | 90.0 |
| | 2 | | 0.0015 | 0.0030 | 1872 | 1699 | 90.8 |
| | 3 | | 0.0085 | 0.0100 | 1873 | 1715 | 91.6 |
| | 4 | | 0.0985 | 0.1000 | 1874 | 1730 | 92.3 |
| | 5 | | 0.9985 | 1.0000 | 1873 | 1727 | 92.2 |
| | 1 | Pb | 0 | 0.0004 | 1872 | 1685 | 90.0 |
| | 2 | | 0.0016 | 0.0020 | 1872 | 1700 | 90.8 |
| | 3 | | 0.0096 | 0.0100 | 1872 | 1722 | 92.0 |
| | 4 | | 0.0996 | 0.1000 | 1873 | 1741 | 93.0 |
| | 5 | | 0.9996 | 1.0000 | 1873 | 1730 | 92.4 |
| | 1 | Bi | 0 | 0.0005 | 1872 | 1685 | 90.0 |
| | 2 | | 0.0015 | 0.0020 | 1872 | 1701 | 90.9 |
| | 3 | | 0.0095 | 0.0100 | 1872 | 1731 | 92.4 |
| | 4 | | 0.0995 | 0.1000 | 1872 | 1743 | 93.1 |
| | 5 | | 0.9995 | 1.0000 | 1873 | 1732 | 92.5 |
| B | 1 | Pb | 0 | 0.0008 | 1864 | 1659 | 89.0 |
| | 2 | | 0.0012 | 0.0020 | 1865 | 1679 | 90.0 |
| | 3 | | 0.0092 | 0.0100 | 1864 | 1721 | 92.3 |
| | 4 | | 0.0992 | 0.1000 | 1864 | 1750 | 93.9 |
| | 5 | | 0.9992 | 1.0000 | 1864 | 1744 | 93.6 |
| | 1 | Bi | 0 | 0.0007 | 1864 | 1659 | 89.0 |
| | 2 | | 0.0013 | 0.0020 | 1864 | 1688 | 90.6 |
| | 3 | | 0.0093 | 0.0100 | 1865 | 1699 | 91.1 |
| | 4 | | 0.0993 | 0.1000 | 1864 | 1734 | 93.0 |
| | 5 | | 0.9993 | 1.0000 | 1865 | 1719 | 92.2 |
| C | 1 | Fe | 0 | 0.0013 | 1847 | 1628 | 88.0 |
| | 2 | | 0.0017 | 0.0030 | 1847 | 1647 | 89.2 |
| | 3 | | 0.0087 | 0.0100 | 1847 | 1661 | 89.9 |
| | 4 | | 0.0987 | 0.1000 | 1848 | 1688 | 91.3 |
| | 5 | | 0.9987 | 1.0000 | 1849 | 1679 | 90.8 |
| | 1 | Pb | 0 | 0.0008 | 1847 | 1625 | 88.0 |
| | 2 | | 0.0012 | 0.0020 | 1848 | 1646 | 89.1 |
| | 3 | | 0.0092 | 0.0100 | 1847 | 1668 | 90.3 |
| | 4 | | 0.0992 | 0.1000 | 1847 | 1689 | 91.4 |
| | 5 | | 0.9992 | 1.0000 | 1848 | 1678 | 90.8 |
| | 1 | Bi | 0 | 0.0007 | 1847 | 1625 | 88.0 |
| | 2 | | 0.0013 | 0.0020 | 1847 | 1644 | 89.0 |
| | 3 | | 0.0093 | 0.0100 | 1848 | 1670 | 90.4 |
| | 4 | | 0.0993 | 0.1000 | 1847 | 1685 | 91.2 |
| | 5 | | 0.9993 | 1.0000 | 1848 | 1679 | 90.0 |
| D | 1 | Fe | 0 | 0.0013 | 1852 | 1706 | 92.1 |
| | 2 | | 0.0017 | 0.0030 | 1853 | 1729 | 93.3 |
| | 3 | | 0.0087 | 0.0100 | 1853 | 1750 | 94.4 |
| | 4 | | 0.0987 | 0.1000 | 1853 | 1777 | 95.9 |
| | 5 | | 0.9987 | 1.0000 | 1853 | 1768 | 95.4 |
| | 1 | Pb | 0 | 0.0010 | 1852 | 1706 | 92.1 |
| | 2 | | 0.0010 | 0.0020 | 1852 | 1727 | 93.3 |
| | 3 | | 0.0090 | 0.0100 | 1853 | 1761 | 95.0 |
| | 4 | | 0.0990 | 0.1000 | 1853 | 1781 | 96.1 |
| | 5 | | 0.9990 | 1.0000 | 1852 | 1766 | 95.4 |
| | 1 | Bi | 0 | 0.0009 | 1852 | 1706 | 92.1 |
| | 2 | | 0.0011 | 0.0020 | 1854 | 1719 | 92.7 |
| | 3 | | 0.0091 | 0.0100 | 1852 | 1758 | 94.9 |
| | 4 | | 0.0991 | 0.1000 | 1853 | 1772 | 95.6 |
| | 5 | | 0.9991 | 1.0000 | 1854 | 1760 | 94.9 |
| E | 1 | Fe | 0 | 0.0013 | 1875 | 1706 | 91.0 |
| | 2 | | 0.0017 | 0.0030 | 1875 | 1724 | 91.9 |

TABLE 7-continued

| Battery | | Impurirty Element | | Initial | 100th | capacity |
|---|---|---|---|---|---|---|
| | | Original content (Weight %) | Final content (Weight %) | Discharge Capacity (mAh) | Discharge Capacity (mAh) | retention rate (%) |
| | 3 | 0.0087 | 0.0100 | 1875 | 1745 | 93.1 |
| | 4 | 0.0987 | 0.1000 | 1875 | 1788 | 95.4 |
| | 5 | 0.9987 | 1.0000 | 1876 | 1780 | 94.9 |
| | 1 Pb | 0 | 0.0011 | 1875 | 1706 | 91.0 |
| | 2 | 0.0009 | 0.0020 | 1876 | 1721 | 91.7 |
| | 3 | 0.0089 | 0.0100 | 1875 | 1741 | 92.9 |
| | 4 | 0.0989 | 0.1000 | 1876 | 1790 | 95.4 |
| | 5 | 0.9989 | 1.0000 | 1876 | 1779 | 94.8 |
| | 1 Bi | 0 | 0.0010 | 1875 | 1706 | 91.0 |
| | 2 | 0.0010 | 0.0020 | 1876 | 1723 | 91.8 |
| | 3 | 0.0090 | 0.0100 | 1877 | 1730 | 92.2 |
| | 4 | 0.0990 | 0.1000 | 1876 | 1759 | 93.8 |
| | 5 | 0.9990 | 1.0000 | 1875 | 1759 | 93.8 |
| F | 1 Fe | 0 | 0.0014 | 1861 | 1694 | 91.0 |
| | 2 | 0.0016 | 0.0030 | 1862 | 1711 | 91.9 |
| | 3 | 0.0086 | 0.0100 | 1861 | 1730 | 93.0 |
| | 4 | 0.0986 | 0.1000 | 1862 | 1755 | 94.3 |
| | 5 | 0.9986 | 1.0000 | 1861 | 1747 | 93.9 |
| | 1 Pb | 0 | 0.0011 | 1861 | 1694 | 91.0 |
| | 2 | 0.0009 | 0.0020 | 1861 | 1710 | 91.9 |
| | 3 | 0.0089 | 0.0100 | 1861 | 1728 | 92.9 |
| | 4 | 0.0989 | 0.1000 | 1862 | 1759 | 94.5 |
| | 5 | 0.9989 | 1.0000 | 1862 | 1745 | 93.7 |
| | 1 Bi | 0 | 0.0010 | 1861 | 1694 | 91.0 |
| | 2 | 0.0010 | 0.0020 | 1862 | 1715 | 92.1 |
| | 3 | 0.0090 | 0.0100 | 1861 | 1729 | 92.9 |
| | 4 | 0.0990 | 0.1000 | 1864 | 1749 | 93.8 |
| | 5 | 0.9990 | 1.0000 | 1863 | 1747 | 93.8 |
| G | 1 Fe | 0 | 0.0013 | 1871 | 1683 | 90.0 |
| | 2 | 0.0017 | 0.0030 | 1871 | 1705 | 91.1 |
| | 3 | 0.0087 | 0.0100 | 1872 | 1722 | 92.0 |
| | 4 | 0.0987 | 0.1000 | 1872 | 1761 | 94.1 |
| | 5 | 0.9987 | 1.0000 | 1872 | 1755 | 93.8 |
| | 1 Bi | 0 | 0.0008 | 1871 | 1683 | 90.0 |
| | 2 | 0.0012 | 0.0020 | 1873 | 1701 | 90.8 |
| | 3 | 0.0092 | 0.0100 | 1872 | 1720 | 91.9 |
| | 4 | 0.0992 | 0.1000 | 1873 | 1750 | 93.4 |
| | 5 | 0.9992 | 1.0000 | 1873 | 1748 | 93.3 |
| H | 1 Fe | 0 | 0.0011 | 1956 | 1760 | 90.0 |
| | 2 | 0.0009 | 0.0020 | 1956 | 1781 | 91.1 |
| | 3 | 0.0089 | 0.0100 | 1957 | 1821 | 93.1 |
| | 4 | 0.0989 | 0.1000 | 1956 | 1845 | 94.3 |
| | 5 | 0.9989 | 1.0000 | 1957 | 1838 | 93.9 |
| I | 1 Fe | 0 | 0.0015 | 1940 | 1727 | 89.0 |
| | 2 | 0.0005 | 0.0020 | 1941 | 1755 | 90.4 |
| | 3 | 0.0085 | 0.0100 | 1940 | 1822 | 93.9 |
| | 4 | 0.0985 | 0.1000 | 1940 | 1861 | 95.9 |
| | 5 | 0.9985 | 1.0000 | 1941 | 1848 | 95.2 |
| J | 1 Fe | 0 | 0.0006 | 1974 | 1796 | 91.0 |
| | 2 | 0.0014 | 0.0020 | 1974 | 1822 | 92.3 |
| | 3 | 0.0094 | 0.0100 | 1975 | 1858 | 94.1 |
| | 4 | 0.0994 | 0.1000 | 1975 | 1899 | 96.2 |
| | 5 | 0.9994 | 1.0000 | 1974 | 1867 | 94.6 |
| K | 1 Fe | 0 | 0.0001 | 1969 | 1772 | 90.0 |
| | 2 | 0.0019 | 0.0020 | 1969 | 1790 | 90.9 |
| | 3 | 0.0099 | 0.0100 | 1969 | 1801 | 91.5 |
| | 4 | 0.0999 | 0.1000 | 1971 | 1833 | 93.0 |
| | 5 | 0.9999 | 1.0000 | 1970 | 1827 | 92.7 |
| L | 1 Fe | 0 | 0.0005 | 1989 | 1750 | 88.0 |
| | 2 | 0.0015 | 0.0020 | 1991 | 1777 | 89.3 |
| | 3 | 0.0095 | 0.0100 | 1990 | 1792 | 90.1 |
| | 4 | 0.0995 | 0.1000 | 1991 | 1825 | 91.7 |
| | 5 | 0.9995 | 1.0000 | 1990 | 1803 | 90.6 |
| M | 1 Fe | 0 | 0.0008 | 1981 | 1783 | 90.0 |
| | 2 | 0.0012 | 0.0020 | 1981 | 1803 | 91.0 |
| | 3 | 0.0092 | 0.0100 | 1981 | 1836 | 92.7 |
| | 4 | 0.0992 | 0.1000 | 1982 | 1881 | 94.9 |
| | 5 | 0.9992 | 1.0000 | 1981 | 1870 | 94.4 |
| N | 1 Pb | 0 | 0.0000 | 1936 | 1764 | 91.1 |
| | 2 | 0.0005 | 0.0005 | 1938 | 1790 | 92.4 |

TABLE 7-continued

| Battery | | Impurirty Element | | Initial Discharge Capacity (mAh) | 100th Discharge Capacity (mAh) | capacity retention rate (%) |
|---|---|---|---|---|---|---|
| | | Original content (Weight %) | Final content (Weight %) | | | |
| | 3 | 0.0100 | 0.0100 | 1936 | 1807 | 93.3 |
| | 4 | 0.1000 | 0.1000 | 1937 | 1825 | 94.2 |
| | 5 | 1.0000 | 1.0000 | 1938 | 1819 | 93.9 |
| O | 1 | Pb 0 | 0.0000 | 1945 | 1751 | 90.0 |
| | 2 | 0.0005 | 0.0005 | 1946 | 1779 | 91.4 |
| | 3 | 0.0100 | 0.0100 | 1947 | 1800 | 92.4 |
| | 4 | 0.1000 | 0.1000 | 1946 | 1805 | 92.8 |
| | 5 | 1.0000 | 1.0000 | 1945 | 1800 | 92.5 |
| P | 1 | Pb 0 | 0.0000 | 1901 | 1692 | 89.0 |
| | 2 | 0.0005 | 0.0005 | 1901 | 1711 | 90.0 |
| | 3 | 0.0100 | 0.0100 | 1901 | 1723 | 90.6 |
| | 4 | 0.1000 | 0.1000 | 1903 | 1739 | 91.4 |
| | 5 | 1.0000 | 1.0000 | 1901 | 1736 | 91.3 |
| Q | 1 | Pb 0 | 0.0002 | 1910 | 1719 | 90.0 |
| | 2 | 0.0003 | 0.0005 | 1910 | 1744 | 91.3 |
| | 3 | 0.0098 | 0.0100 | 1910 | 1748 | 91.5 |
| | 4 | 0.0998 | 0.1000 | 1911 | 1786 | 93.5 |
| | 5 | 0.9998 | 1.0000 | 1910 | 1751 | 91.7 |
| R | 1 | Pb 0 | 0.0000 | 1949 | 1754 | 90.0 |
| | 2 | 0.0005 | 0.0005 | 1950 | 1776 | 91.1 |
| | 3 | 0.0100 | 0.0100 | 1950 | 1799 | 92.3 |
| | 4 | 0.1000 | 0.1000 | 1951 | 1833 | 94.0 |
| | 5 | 1.0000 | 1.0000 | 1951 | 1830 | 93.8 |
| S | 1 | Pb 0 | 0.0000 | 1907 | 1697 | 89.0 |
| | 2 | 0.0005 | 0.0005 | 1908 | 1717 | 90.0 |
| | 3 | 0.0100 | 0.0100 | 1907 | 1728 | 90.6 |
| | 4 | 0.1000 | 0.1000 | 1907 | 1747 | 91.6 |
| | 5 | 1.0000 | 1.0000 | 1908 | 1740 | 91.2 |

TABLE 8

| | | Negative/Electrode material | Initial Discharge Capacity (mAh) | Capacity retention rate (%) |
|---|---|---|---|---|
| Exemplary Embodiment | 1 | Material A | 2074 | 96 |
| | 2 | B | 2065 | 98 |
| | 3 | C | 2043 | 97 |
| | 4 | D | 2056 | 98 |
| | 5 | E | 2075 | 97 |
| | 6 | F | 2064 | 96 |
| | 7 | G | 2073 | 98 |
| | 8 | H | 2152 | 97 |
| | 9 | I | 2146 | 98 |
| | 10 | J | 2174 | 96 |
| | 11 | K | 2165 | 98 |
| | 12 | L | 2184 | 97 |
| | 13 | M | 2182 | 95 |
| | 14 | N | 2136 | 97 |
| | 15 | O | 2147 | 98 |
| | 16 | P | 2101 | 96 |
| | 17 | Q | 2110 | 97 |
| | 18 | R | 2149 | 97 |
| | 19 | S | 2107 | 98 |
| Comparative Example | | Graphite | 1710 | 93 |

TABLE 9

| | | Negative Electrode material | Initial Discharge Capacity (mAh) | Capacity retention rate (%) |
|---|---|---|---|---|
| Exemplary Embodiment | 1 | Material A | 2072 | 97 |
| | 2 | B | 2064 | 96 |
| | 3 | C | 2047 | 95 |
| | 4 | D | 2052 | 97 |
| | 5 | E | 2075 | 98 |
| | 6 | F | 2061 | 98 |
| | 7 | G | 2071 | 97 |
| | 8 | H | 2156 | 97 |
| | 9 | I | 2140 | 96 |
| | 10 | J | 2174 | 98 |
| | 11 | K | 2169 | 97 |
| | 12 | L | 2189 | 95 |
| | 13 | M | 2181 | 97 |
| | 14 | N | 2139 | 98 |
| | 15 | O | 2145 | 97 |
| | 16 | P | 2101 | 96 |
| | 17 | Q | 2110 | 97 |
| | 18 | R | 2149 | 97 |
| | 19 | S | 2107 | 96 |
| Comparative Example | | Graphite | 1710 | 93 |

TABLE 10

| | | Elements added | Content | Material C Initial Discharge Capacity (mAh) | Material C Capacity retention rate (%) | Material J Initial Discharge Capacity (mAh) | Material J Capacity retention rate (%) |
|---|---|---|---|---|---|---|---|
| Oxides | 1 | Ag2O | 9.06 | 2175 | 96 | 2170 | 97 |
| | 2 | PbO | 8.75 | 2156 | 97 | 2156 | 97 |
| | 3 | NiO | 6.65 | 2165 | 98 | 2168 | 95 |
| | 4 | Ni2O3 | 3.11 | 2164 | 95 | 2166 | 96 |
| | 5 | CoO | 6.65 | 2173 | 97 | 2174 | 98 |
| | 6 | Co2O3 | 10.31 | 2182 | 98 | 2188 | 95 |
| | 7 | Co3O4 | 3.30 | 2166 | 97 | 2165 | 96 |
| | 8 | CuO | 5.94 | 2167 | 98 | 2168 | 96 |
| | 9 | Cu2O | 16.67 | 2188 | 96 | 2187 | 97 |
| | 10 | Bi2O3 | 11.11 | 2175 | 95 | 2177 | 95 |
| | 11 | Sb2O3 | 6.12 | 2173 | 97 | 2176 | 97 |
| | 12 | Cr2O3 | 6.95 | 2162 | 98 | 2169 | 98 |
| | 13 | MnO2 | | 2172 | 97 | 2171 | 97 |
| | 14 | Fe3O4 | | 2176 | 96 | 2175 | 96 |
| Sulfides | 1 | Ag2S | 9.71 | 2164 | 95 | 2165 | 97 |
| | 2 | PbS | 9.38 | 2173 | 96 | 2174 | 96 |
| | 3 | NiS | 3.56 | 2182 | 96 | 2180 | 98 |
| | 4 | Ni2S | 2.93 | 2176 | 97 | 2174 | 96 |
| | 5 | Ni3S4 | 2.98 | 2177 | 98 | 2172 | 96 |
| | 6 | CoS | 3.57 | 2177 | 96 | 2173 | 96 |
| | 7 | Co2S3 | 2.8 | 2176 | 95 | 2175 | 97 |
| | 8 | Co3O4 | 2.99 | 2175 | 97 | 2177 | 98 |
| | 9 | CuS | 3.75 | 2177 | 96 | 2172 | 96 |
| | 10 | Cu2S | 6.24 | 2175 | 98 | 2174 | 97 |
| | 11 | Bi2S3 | 6.72 | 2179 | 97 | 2176 | 96 |
| | 12 | Sb2S3 | 4.44 | 2172 | 96 | 2177 | 97 |
| | 13 | Sb2S4 | 3.64 | 2174 | 97 | 2174 | 97 |
| | 14 | Sb2S5 | 3.17 | 2186 | 98 | 2181 | 97 |
| | 15 | CrS | 3.30 | 2167 | 96 | 2169 | 97 |
| | 16 | Cr2S3 | 2.62 | 2178 | 97 | 2177 | 98 |
| | 17 | MnS | 3.41 | 2166 | 96 | 2169 | 97 |
| | 18 | Mn3S4 | 2.87 | 2185 | 97 | 2180 | 96 |
| | 19 | MnS2 | 2.33 | 2174 | 98 | 2177 | 97 |
| | 20 | FeS | 3.45 | 2173 | 96 | 2175 | 97 |
| | 21 | Fe2S3 | 2.72 | 2172 | 97 | 2179 | 96 |
| | 22 | FeS2 | 2.35 | 2182 | 98 | 2180 | 96 |
| | 23 | Mo2S3 | 3.76 | 2181 | 95 | 2182 | 98 |
| | 24 | MoS2 | 3.14 | 2175 | 96 | 2175 | 98 |
| Selenides | 1 | Ag2Se | 11.55 | 2177 | 97 | 2176 | 96 |
| | 2 | PbSe | 11.22 | 2176 | 98 | 2174 | 98 |
| | 3 | Co2Se3 | 4.64 | 2165 | 97 | 2175 | 97 |
| | 4 | Co3Se4 | 4.83 | 2176 | 97 | 2174 | 96 |
| | 5 | CuSe | 5.59 | 2173 | 97 | 2179 | 96 |
| | 6 | Cu2Se | 8.08 | 2182 | 96 | 2180 | 95 |
| | 7 | Bi2Se3 | 8.56 | 2176 | 95 | 2175 | 97 |
| | 8 | Sb2Se3 | 6.28 | 2166 | 98 | 2167 | 98 |
| | 9 | Sb2Se5 | 5.00 | 2167 | 96 | 2169 | 98 |
| | 10 | Cr2Se3 | 4.45 | 2188 | 95 | 2180 | 96 |
| Terulides | 1 | Ag2Te | 13.46 | 2177 | 96 | 2174 | 97 |
| | 2 | PbTe | 13.12 | 2176 | 96 | 2170 | 97 |
| | 3 | NiTe | 7.30 | 2185 | 98 | 2180 | 98 |
| | 4 | Ni2Te3 | 6.54 | 2173 | 96 | 2174 | 97 |
| | 5 | CuTe | 7.49 | 2172 | 98 | 2175 | 97 |
| | 6 | Cu2Te | 9.98 | 2176 | 97 | 2179 | 98 |
| | 7 | Bi2Te3 | 10.46 | 2178 | 96 | 2170 | 97 |
| | 8 | Sb2Te3 | 8.80 | 2175 | 97 | 2171 | 96 |

TABLE 11

| Negative Electrode material | favorable ranges From "cycle life" | favorable ranges From "Capacity retention rate" |
|---|---|---|
| Material A | not less than 0.4 (2.0) | not more than 12 (4) |
| B | not less than 0.3 (1.0) | not more than 12 (4) |
| C | not less than 0.4 (2.0) | not more than 11 (4) |
| D | not less than 0.4 (2.0) | not more than 11 (4) |
| E | not less than 0.3 (1.0) | not more than 12 (4) |
| F | not less than 0.3 (1.0) | not more than 12 (4) |
| G | not less than 0.3 (1.0) | not more than 12 (4) |
| H | not less than 0.4 (1.0) | not more than 11 (4) |

TABLE 11-continued

| Negative Electrode material | favorable ranges | |
|---|---|---|
| | From "cycle life" | From "Capacity retention rate" |
| I | not less than 0.4 (1.0) | not more than 12 (4) |
| J | not less than 0.3 (1.0) | not more than 12 (4) |
| K | not less than 0.4 (2.0) | not more than 11 (5) |
| L | not less than 0.4 (2.0) | not more than 12 (4) |
| M | not less than 0.3 (1.0) | not more than 12 (4) |
| N | not less than 0.3 (2.0) | not more than 12 (4) |
| O | not less than 0.5 (2.0) | not more than 11 (4) |
| P | not less than 0.5 (2.0) | not more than 12 (4) |
| Q | not less than 0.5 (2.0) | not more than 11 (3) |
| R | not less than 0.5 (2.0) | not more than 11 (4) |
| S | not less than 0.5 (2.0) | not more than 11 (4) |

TABLE 12

| Negative Electrode material | favorable R2/R1 ranges | |
|---|---|---|
| | From "cycle life" | From "Capacity retention rate" |
| Material A | not less than 0.01 (0.05) | not more than 15 (1) |
| B | not less than 0.01 (0.05) | not more than 15 (2) |
| C | not less than 0.01 (0.05) | not more than 14 (3) |
| D | not less than 0.03 (0.08) | not more than 13 (1) |
| E | not less than 0.02 (0.07) | not more than 14 (2) |
| F | not less than 0.02 (0.05) | not more than 15 (1) |
| G | not less than 0.01 (0.07) | not more than 15 (2) |
| H | not less than 0.01 (0.05) | not more than 15 (1) |
| I | not less than 0.01 (0.05) | not more than 15 (2) |
| J | not less than 0.01 (0.05) | not more than 15 (2) |
| K | not less than 0.03 (0.08) | not more than 13 (1) |
| L | not less than 0.02 (0.08) | not more than 14 (2) |
| M | not less than 0.02 (0.08) | not more than 15 (2) |
| N | not less than 0.03 (0.08) | not more than 13 (1) |
| O | not less than 0.03 (0.09) | not more than 13 (1) |
| P | not less than 0.02 (0.09) | not more than 12 (1) |
| Q | not less than 0.02 (0.09) | not more than 13 (1) |
| R | not less than 0.02 (0.09) | not more than 13 (1) |
| S | not less than 0.02 (0.08) | not more than 12 (1) |

What is claimed is:

1. A non-aqueous electrolyte secondary battery comprising:
   a) a positive electrode and a negative electrode capable of intercalating and de-intercalating lithium;
   b) a non-aqueous electrolyte; and
   c) one of a separator and a solid electrolyte,
   wherein:
   said negative electrode comprises a plurality of composite particles,
   each of said composite particles comprises a central portion consisting essentially of at least one element selected from the group consisting of tin, silicon and zinc, and a coating at least partially around said central portion, said coating comprising a solid solution or an intermetallic compound,
   said solid solution or said inter-metallic compound comprises a) at least one element selected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound,
   said negative electrode comprises a mixture layer comprising said plurality of composite particles, and
   the porosity of said mixture layer is not less than 10% and not more than 50%.

2. The non-aqueous electrolyte secondary battery of claim 1, wherein said non-aqueous electrolyte battery comprises not less than 0.1 mL and not more than 0.4 mL of electrolyte per 1 g of the total weight said positive electrode and said negative electrode.

3. The non-aqueous electrolyte secondary battery of claim 1, wherein when an impedance of an electrochemical cell is measured, R2/R1 is between 0.01 and 15;
   wherein:
   said electrochemical cell comprises either said positive electrode or said negative electrode as an active electrode, and lithium metal as an opposite electrode; and
   R1 is a diameter of a semi-circle plotted on a complex plane when the cell comprises the positive electrode as the active electrode, and R2 is a diameter of a semi-circle plotted on a complex plane when the cell comprises the negative electrode as the active electrode.

4. The non-aqueous electrolyte secondary battery of claim 1, wherein said battery comprises said separator, the thickness of said separator is not less than 15 $\mu$m and not more than 40 $\mu$m, and the piercing strength of said separator is not less than 200 g.

5. The non-aqueous electrolyte secondary battery of claim 1 wherein said negative electrode comprises a fluorinated carbon compound of the composition $C_xF$, in which 1<x<20.

6. The non-aqueous electrolyte secondary battery of claim 5, wherein said fluorinated carbon compound is selected from the group consisting of fluorinated thermal black, acetylene black, furnace black, vapor phase grown carbon fibers, thermally decomposed carbons, natural graphite, synthetic graphite, meso-phase carbon micro beads, petroleum cokes, coal cokes, petroleum derived carbon fibers, coal derived carbon fibers, charcoal, activated carbon, glassy carbon, rayon derived carbon fibers, PAN derived carbon fibers, and mixtures thereof.

7. The non-aqueous electrolyte secondary battery of claim 5, wherein an amount of said fluorinated carbon compound to be added to said negative electrode corresponds to difference in irreversible capacity between said positive electrode and said negative electrode, which does not contribute to an initial discharging.

8. The non-aqueous electrolyte secondary battery of claim 5, wherein content of said fluorinated carbon compound is in a range of 0.2%–20% of a sum of said fluorinated carbon compound and said composite particle.

9. The non-aqueous electrolyte secondary battery of claim 5, wherein said positive electrode comprises a lithium containing metallic oxide of the formula $Li_xNi_{1-y}M_yO_z$;
   wherein:
   M is selected from the group consisting of Na, Mg, Sc, Y, Mn, Fe, Co, Ni, Cu, Zn, Al, Cr, Pb, Sb, B, and mixtures thereof; and
   x=0 to 1.2, y=0 to 0.9, and z=2.0 to 2.3.

10. The non-aqueous electrolyte secondary battery of claim 9, wherein an efficiency rate of initial charging/discharging in which said lithium-containing metallic compound de-intercalates lithium ions during initial charging and intercalates lithium ions during initial discharging, is within a range of 75–95%.

11. The non-aqueous electrolyte secondary battery of claim 9, wherein said lithium-containing metallic oxide is synthesized by a process in which a metallic hydroxide is mixed with a lithium hydroxide and heated.

12. The non-aqueous electrolyte secondary battery of claim 9, wherein an efficiency rate of initial charging/discharging in which said lithium-containing metallic compound de-intercalates lithium ions during initial charging and intercalates lithium ions during initial discharging, is within a range of 75–95%.

13. The non-aqueous electrolyte secondary battery of claim 1, wherein said negative electrode additionally comprises a metallic compound which is electrochemically reduced to a metal when said negative electrode is charged.

14. The non-aqueous electrolyte secondary battery of claim 13, wherein said metallic compound is selected from the group consisting of metallic oxides, metallic sulfides, metallic selenides, metallic tellurides, and mixtures thereof.

15. The non-aqueous electrolyte secondary battery of claim 13, wherein said metallic oxide is at least one of $Ag_2O$, PbO, NiO, $Ni_2O_3$, CoO, $Co_2O_3$, $Co_3O_4$, CuO, $Cu_2O$, $Bi_2O_3$, $Sb_2O_3$, $Cr_2O_3$, $MnO_2$ and $FeO_4$.

16. The non-aqueous electrolyte secondary battery of claim 13, wherein said metallic sulfide is at least one of $Ag_2S$, PbS, NiS, $Ni_2S$, $Ni_3S_4$, CoS, $Co_2S_3$, $Co_3S_4$, CuS, $Cu_2S$, $Bi_2S_3$, $Sb_2S_3$, $Sb_2S_4$, $Sb_2S_5$, CrS, $Cr_2S_3$, MnS, $Mn_3S_4$, $MnS_2$ and FeS, $Fe_2S_3$, $FeS_2$, $Mo_2S_3$, and $MOS_2$.

17. The non-aqueous electrolyte secondary battery of claim 13, wherein said metallic selenide is at least one material selected from a group consisting of $Ag_2Se$, PbSe, $Co_2Se_3$, $Co_3Se_4$, CuSe, $Cu_2Se$, $Bi_2Se_3$, $Sb_2Se_3$, $Sb_2Se5$, and $Cr_2Se_3$.

18. The non-aqueous electrolyte secondary battery of claim 13, wherein said metallic telluride is at least one material selected from the group consisting of $Ag_2Te$, PbTe, NiTe, $Ni_2Te_3$, CuTe, $Cu_2Te$, $Bi_2Te_3$ and $Sb_2Te_3$.

19. The non-aqueous electrolyte secondary battery of claim 13, wherein the amount of said metallic compound present in said negative electrode corresponds to the difference in irreversible capacity between said positive electrode and said negative electrode, which does not contribute to an initial discharging.

20. The non-aqueous electrolyte secondary battery of claim 13, wherein the amount of said metallic compound is 0.2%–20% of the total amount of said metallic compound and said composite particles.

21. The non-aqueous electrolyte secondary battery of claim 13, wherein said positive electrode comprises a lithium containing metallic compound of the formula of $Li_xNi_{1-y}M_yO_z$; wherein M is selected from the group consisting of Na, Mg, Sc, Y, Mn, Fe, Co, Ni, Cu, Zn, Al, Cr, Pb, Sb, B, and mixtures thereof, and x=0 to 1, Y=0 to 0.9, and z=2.0 to 2.3.

22. The non-aqueous electrolyte secondary battery of claim 13, wherein said at least one element selected from the group consisting of tin, silicon, and zinc in said central portion is tin, and said at least one element selected from the group consisting of tin, silicon, and zinc in said solid solution or inter-metallic compound is tin.

23. The non-aqueous electrolyte secondary battery of claim 13 wherein said at least one element selected from the group consisting of tin, silicon, and zinc in said central portion is silicon, and said at least one element selected from the group consisting of tin, silicon, and zinc in said solid solution or inter-metallic compound is silicon.

24. The non-aqueous electrolyte secondary battery of claim 13, wherein said at least one element selected from the group consisting of tin, silicon, and zinc in said central portion is zinc, and said at least one element selected from the group consisting of tin, silicon, and zinc in said solid solution or inter-metallic compound is zinc.

25. The non-aqueous electrolyte secondary battery of claim 1, wherein said at least one element selected from the group consisting of tin, silicon, and zinc in said central portion is silicon, and said at least one element selected from the group consisting of tin, silicon, and zinc in said solid solution or inter-metallic compound is silicon.

26. A non-aqueous electrolyte secondary battery comprising:
  a) a positive electrode and a negative electrode capable of intercalating and de-intercalating lithium;
  b) a non-aqueous electrolyte; and
  c) one of a separator and a solid electrolyte,
  wherein:
    said negative electrode comprises a plurality of composite particles,
    each of said composite particles comprises a central portion consisting essentially of at least one element selected from the group consisting of tin, silicon and zinc, and a coating at least partially around said central portion, said coating comprising a solid solution or an intermetallic compound,
    said solid solution or said inter-metallic compound comprises a) at least one element selected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound,
    said negative electrode comprises a mixture layer comprising said plurality of composite particles,
    the porosity of said mixture layer is not less than 10% and not more than 50%, and
    the ratio of the specific surface area of the negative electrode material to the specific surface area of the positive electrode material is not less than 0.3 and not more than 12.

27. A non-aqueous electrolyte secondary battery comprising;
  a) a positive electrode and a negative electrode capable of intercalating and de-intercalating lithium;
  b) a non-aqueous electrolyte; and
  c) one of a separator and a solid electrolyte,
  wherein:
    said negative electrode comprises a plurality of composite particles,
    each of said composite particles comprises a central portion comprising at least one element selected from the group consisting of tin, silicon and zinc, and a coating at least partially around said central portion, said coating comprising a solid solution or an intermetallic compound,
    said solid solution or said inter-metallic compound comprises a) at least one element selected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound, said negative electrode comprises a mixture layer comprising said plurality of composite particles, the porosity of said mixture layer is not less than 10% and not more than 50%, and said composite particles additionally comprise at least one added element selected from the group consisting of not less than 0.002 wt % iron, not less than 0.0005 wt % lead, and not less than 0.002 wt % bismuth.

28. The non-aqueous electrolyte secondary battery of claim 27, wherein said negative electrode additionally comprises a metallic compound which is electrochemically reduced to a metal when said negative electrode is charged, said metallic compound is selected from the group consisting of metallic oxides, metallic sulfides, metallic selenides, metallic tellurides, and mixtures thereof.

29. A non-aqueous electrolyte secondary battery comprising:
a) a positive electrode and a negative electrode capable of intercalating and de-intercalating lithium;
b) a non-aqueous electrolyte; and
c) one of a separator and a solid electrolyte,
wherein:
said negative electrode comprises a plurality of composite particles,
each of said composite particles comprises a central portion comprising at least one element selected from the group consisting of tin, silicon and zinc, and a coating at least partially around said central portion, said coating comprising a solid solution or an intermetallic compound,
said solid solution or said inter-metallic compound comprises a) at least one element selected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound,
said negative electrode comprises a mixture layer comprising said plurality of composite particles,
the porosity of said mixture layer is not less than 10% and not more than 50%, and
said negative electrode additionally comprises a metallic compound which is electrochemically reduced to a metal when said negative electrode is charged.

30. The non-aqueous electrolyte secondary battery of claim 29, wherein said metallic compound is selected from the group consisting of metallic oxides, metallic sulfides, metallic selenides, metallic tellurides, and mixtures thereof.

31. The non-aqueous electrolyte secondary battery of claim 30, wherein the amount of said metallic compound is 0.2%–20% of the total amount of said metallic compound and said composite particles.

32. A non-aqueous electrolyte secondary battery comprising:
a) a positive electrode and a negative electrode capable of intercalating and de-intercalating lithium;
b) a non-aqueous electrolyte; and
c) one of a separator and a solid electrolyte,
wherein:
said negative electrode comprises a plurality of composite particles,
each of said composite particles comprises a central portion consisting essentially of at least one element selected from the group consisting of tin, silicon and zinc, and a coating at least partially around said central portion, said coating comprising a solid solution or an intermetallic compound,
said solid solution or said inter-metallic compound comprises a) at least one element selected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound,
said negative electrode comprises a mixture layer comprising said plurality of composite particles,
the porosity of said mixture layer is not less than 10% and not more than 50%, and
said at least one element selected from the group consisting of tin, silicon, and zinc in said central portion is tin, and said at least one element selected from the group consisting of tin, silicon, and zinc in said solid solution or inter-metallic compound is tin.

33. A non-aqueous electrolyte secondary battery comprising:
a) a positive electrode and a negative electrode capable of intercalating and de-intercalating lithium;
b) a non-aqueous electrolyte; and
c) one of a separator and a solid electrolyte,
wherein:
said negative electrode comprises a plurality of composite particles,
each of said composite particles comprises a central portion consisting essentially of at least one element selected from the group consisting of tin, silicon and zinc, and a coating at least partially around said central portion, said coating comprising a solid solution or an intermetallic compound,
said solid solution or said inter-metallic compound comprises a) at least one element selected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound,
said negative electrode comprises a mixture layer comprising said plurality of composite particles,
the porosity of said mixture layer is not less than 10% and not more than 50%, and
said at least one element selected from the group consisting of tin, silicon, and zinc in said central portion is zinc, and said at least one element selected from the group consisting of tin, silicon, and zinc in said solid solution or inter-metallic compound is zinc.

34. A non-aqueous electrolyte secondary battery comprising:
a) a positive electrode and a negative electrode capable of intercalating and de-intercalating lithium;
b) a non-aqueous electrolyte; and
c) one of a separator and a solid electrolyte,
wherein:
said negative electrode comprises a plurality of composite particles, each of said composite particles comprises a central portion consisting essentially of at least one element selected from the group consisting of tin, silicon and zinc, and a coating at least partially around said central portion, said coating comprising a solid solution or an intermetallic compound, said solid solution or said inter-metallic compound comprises a) said element elected from the group consisting of tin, silicon and zinc, and b) at least one element selected from the group consisting of group 2 elements, transition elements, group 12 elements, group 13 elements and group 14 elements of the Periodic Table exclusive of carbon and exclusive of said element selected from the group consisting of tin, silicon, and zinc in said solid solution or said inter-metallic compound, said negative electrode comprises a mixture layer comprising said plurality of composite particles, and the porosity of said mixture layer is not less than 10% and not more than 50%.

35. The non-aqueous electrolyte secondary battery of claim 34, wherein the ratio of the specific surface area of the negative electrode material to the specific surface area of the positive electrode material is not less than 0.3 and not more than 12.

* * * * *